United States Patent
Kim et al.

(10) Patent No.: US 9,973,703 B2
(45) Date of Patent: May 15, 2018

(54) MOBILE TERMINAL AND METHOD FOR CONTROLLING THE SAME

(71) Applicant: LG ELECTRONICS INC., Seoul (KR)

(72) Inventors: Sehee Kim, Seoul (KR); Kyungah Lim, Seoul (KR); Youseok Moon, Seoul (KR); Chulhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 15/162,283

(22) Filed: May 23, 2016

(65) Prior Publication Data

US 2017/0142339 A1   May 18, 2017

(30) Foreign Application Priority Data

Nov. 12, 2015   (KR) .................. 10-2015-0159182

(51) Int. Cl.
*H04N 5/232* (2006.01)

(52) U.S. Cl.
CPC ..... *H04N 5/23293* (2013.01); *H04N 5/23216* (2013.01); *H04N 5/23241* (2013.01); *H04N 5/23245* (2013.01)

(58) Field of Classification Search
CPC ........... H04N 5/23216; H04N 5/23241; H04N 5/23245; H04N 5/23293
See application file for complete search history.

(56) References Cited

U.S. PATENT DOCUMENTS

| | | | |
|---|---|---|---|
| 6,876,393 B1 | 4/2005 | Yokonuma | |
| 2005/0060659 A1* | 3/2005 | Verdun | G06F 3/04847 715/772 |
| 2011/0242360 A1* | 10/2011 | Mori | H04N 5/772 348/231.1 |
| 2014/0365789 A1* | 12/2014 | Seo | G06F 1/266 713/300 |
| 2014/0375862 A1* | 12/2014 | Kim | H04N 5/23245 348/333.02 |
| 2015/0215537 A1* | 7/2015 | Nishizaka | H04N 5/23245 348/220.1 |

OTHER PUBLICATIONS

European Patent Office Application Serial No. 16000863.7, Search Report dated Mar. 28, 2017, 8 pages.

* cited by examiner

*Primary Examiner* — Abdelaaziz Tissire
(74) *Attorney, Agent, or Firm* — Lee, Hong, Degerman, Kang & Waimey

(57) ABSTRACT

The present invention relates to a mobile terminal capable of capturing an image by time-lapse photography, and a method for controlling the same. The mobile terminal includes: a camera; a display; and a controller configured to cause the display to display a preview image of an image to be captured via the camera by time-lapse photography; and calculate at least one capturing set value that is different from a preset capturing set value for the time-lapse photography based on at least one of an input of a capturing set value, a battery usage amount, or a memory usage amount.

18 Claims, 29 Drawing Sheets

FIG. 18
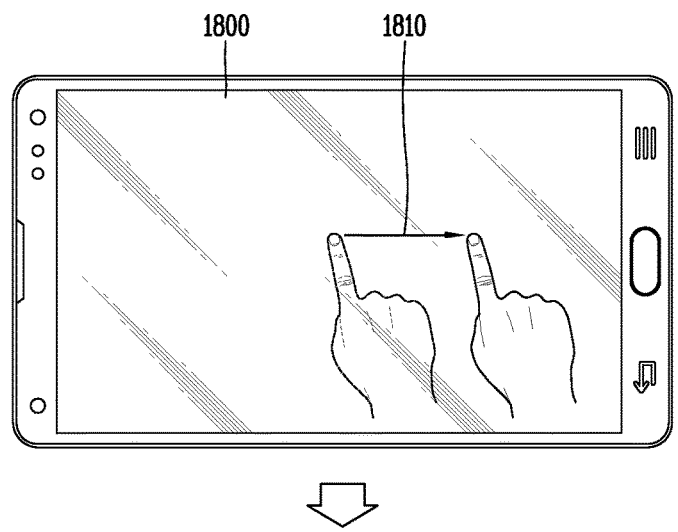
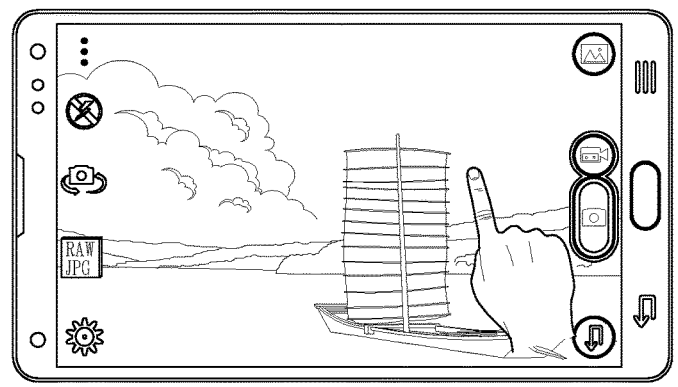
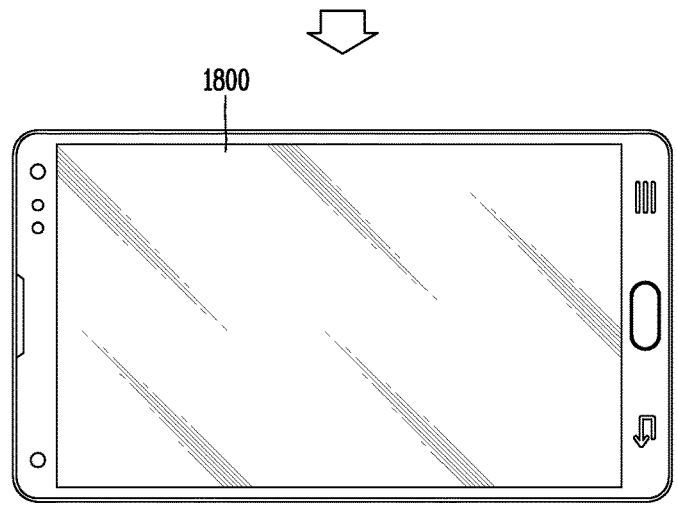

FIG. 26
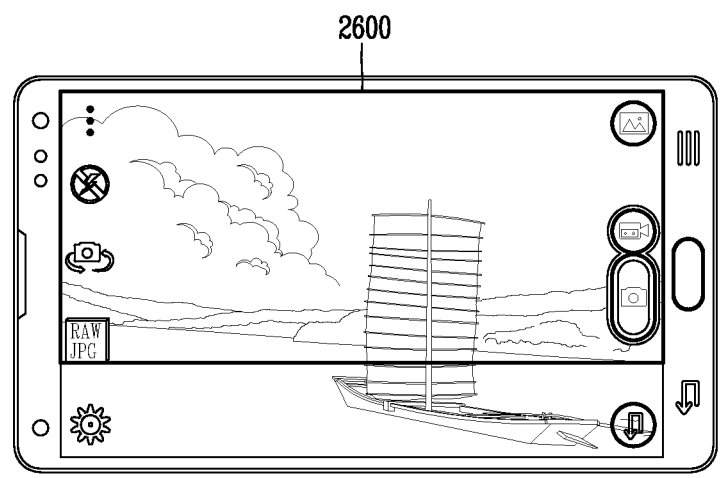
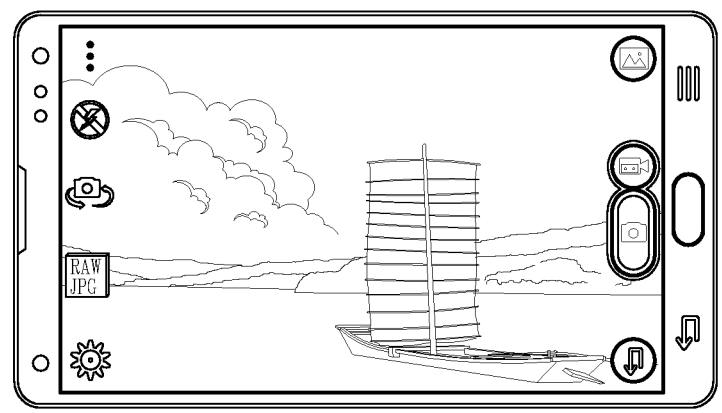

FIG. 27
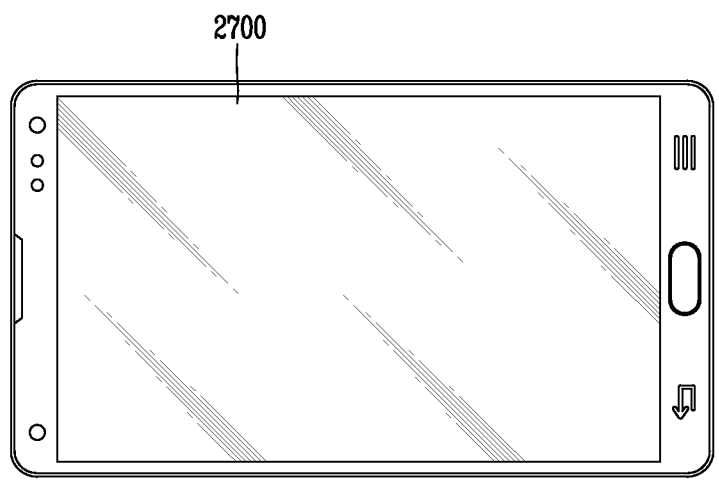
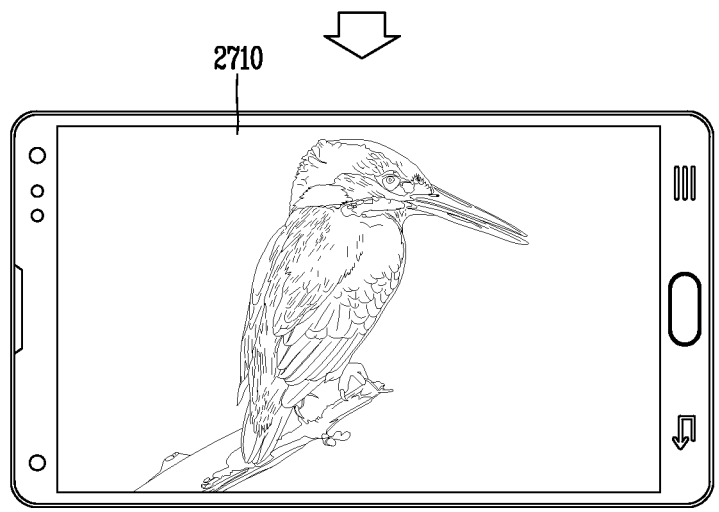

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0159182, filed on Nov. 12, 2015, the contents of which are all hereby incorporated by reference herein in its entirety.

BACKGROUND OF THE INVENTION

1. Field of the Invention

The present invention relates to a mobile terminal, and more particularly, to a mobile terminal capable of capturing an image by time-lapse photography, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

The mobile terminal is also capable of capturing an image by time-lapse photography. However, a user should directly monitor or control a battery usage amount, a memory usage amount, a capturing time, etc. Further, a user does not view a screen during time-lapse photography, and a battery consumption amount is increased.

SUMMARY OF THE INVENTION

Therefore, an aspect of the detailed description is to provide a mobile terminal capable of calculating one or more capturing set values for time-lapse photography, based on a preset battery usage amount or a preset memory usage amount, and a method for controlling the same.

To achieve these and other advantages and in accordance with the purpose of this specification, as embodied and broadly described herein, there is provided a mobile terminal, including: a camera; a display; and a controller configured to cause the display to display a preview image of an image to be captured via the camera by time-lapse photography; and calculate at least one capturing set value that is different from a preset capturing set value for the time-lapse photography based on at least one of an input of a capturing set value, a battery usage amount, or a memory usage amount.

To achieve these and other advantages and in accordance with the purpose of this specification, as embodied and broadly described herein, there is also provided a method for controlling a mobile terminal, the method including: displaying, via a display, a preview image of an image to be captured via a camera by time-lapse photography; and calculating at least one capturing set value that is different from a preset capturing set value for the time-lapse photography based on at least one of an input of a capturing set value, a battery usage amount, or a memory usage amount.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 10 is a conceptual view illustrating an embodiment to output a screen for resetting capturing set values when a battery usage amount is deficient during time-lapse photography;

FIGS. 17 and 18 are conceptual views illustrating an embodiment to temporarily output a preview image of an image being captured, to an upper layer, by a drag input;

FIG. 26 is a conceptual view illustrating an embodiment to output a capturing guide line based on a motion of a mobile terminal;

FIG. 27 is a conceptual view illustrating an embodiment to control an upper layer to disappear by change of a capturing object.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
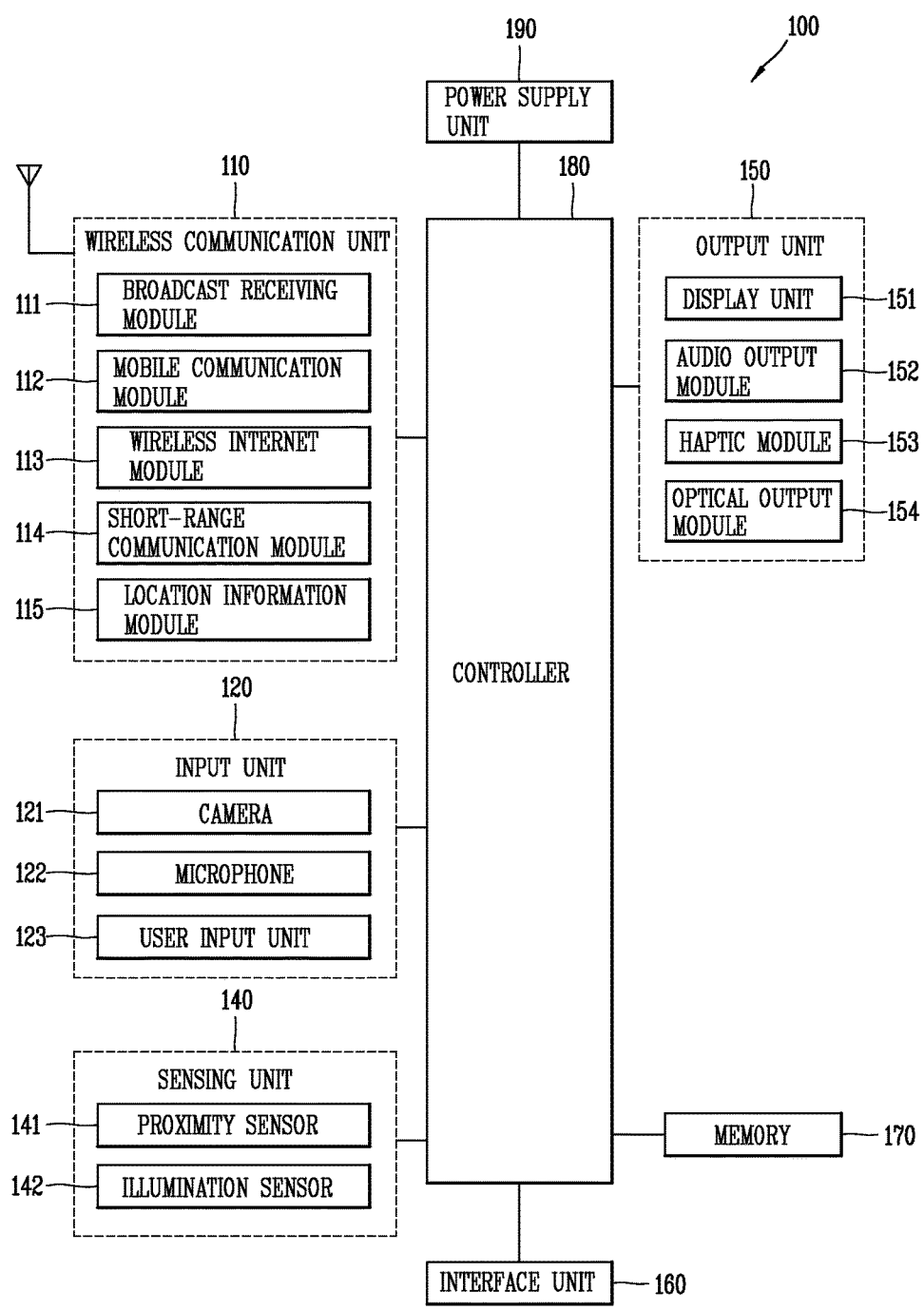
FIG. 1A is a block diagram of a mobile terminal according to the present invention.
Figure 1B:
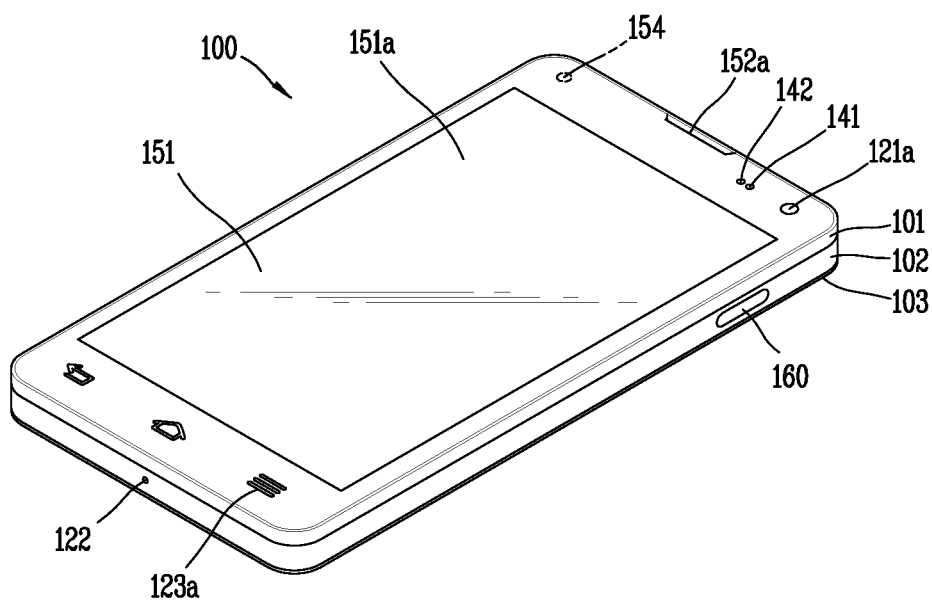
FIGS. 1B and 10 are conceptual views illustrating an example of a mobile terminal according to the present invention, which are viewed from different directions.
Figure 1C:
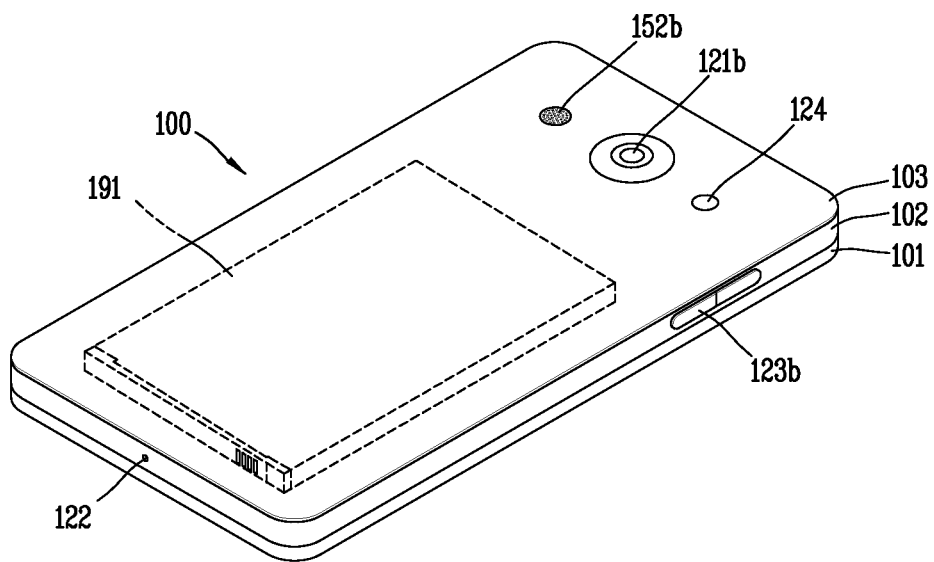
Figure 8:
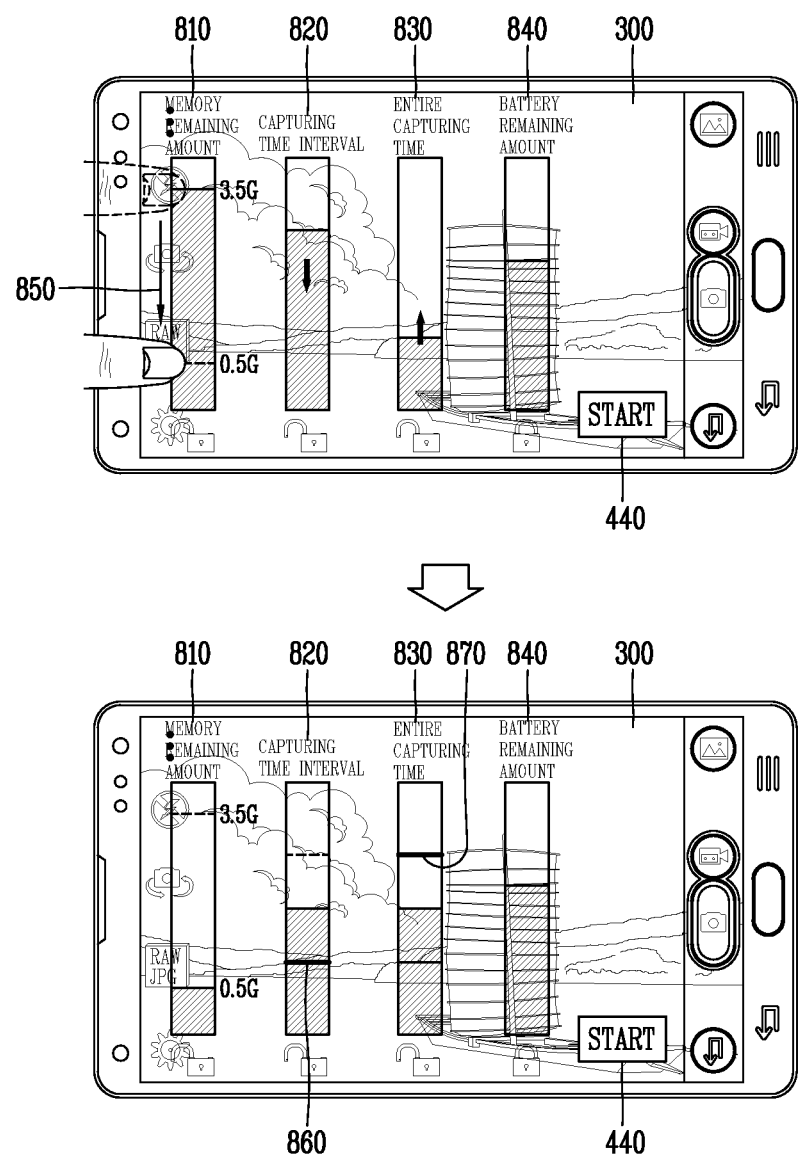
FIG. 8 is a conceptual view illustrating an embodiment to set a memory usage amount to be used for time-lapse photography.
Figure 9:
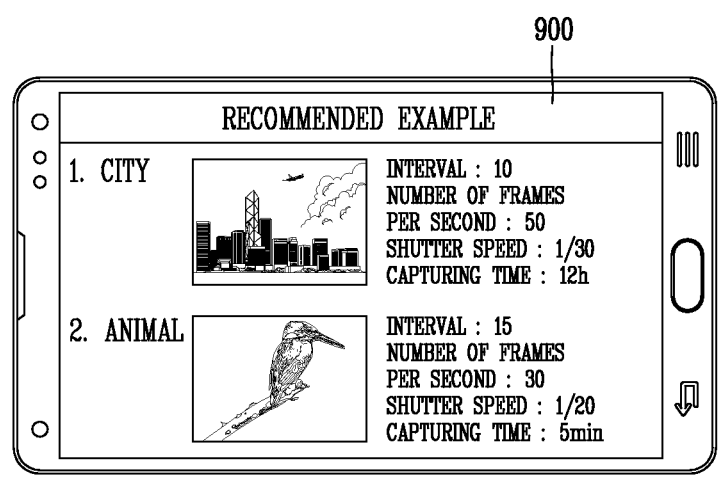
FIG. 9 is a conceptual view illustrating an embodiment to recommend a capturing set value by capturing object.
Figure 10:
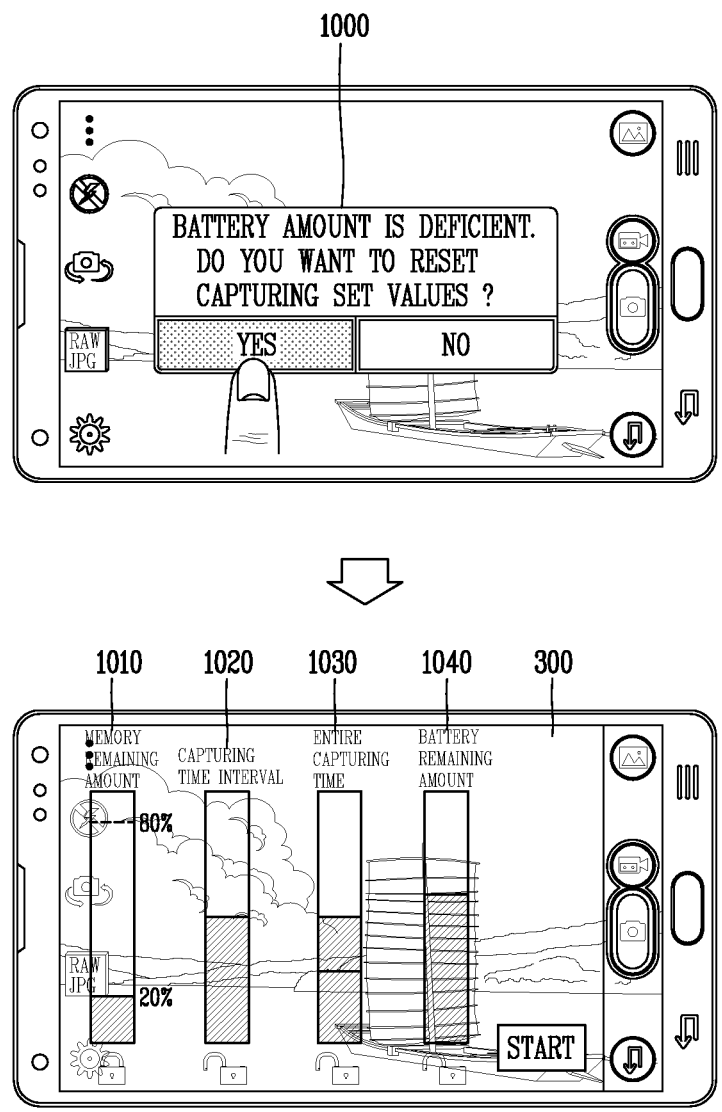

Reference is now made to FIGS. 1A-10, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the mobile terminal may be implemented on the mobile terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102.

Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided.

The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information. The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Figure 2:
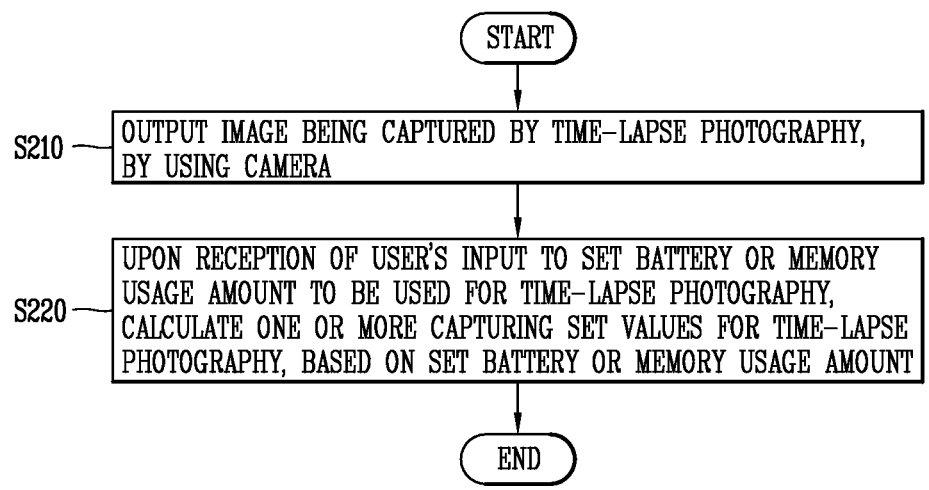
FIG. 2 is a flowchart illustrating a method of controlling a mobile terminal according to the present invention.

FIG. 2 is a flowchart illustrating a method of controlling a mobile terminal according to the present invention.

Referring to FIG. 2, a preview image of an image being captured by the camera 121 by time-lapse photography is output (S210).

The time-lapse photography is a technique whereby the frequency at which film frames are captured (the frame rate) is much lower than that used to view the sequence. When played at normal speed, time appears to be moving faster and thus lapsing. More specifically, a series of movements of a subject are captured for a predetermined time as photos, and the captured photos are connected to each other to generate a single file.

Then, if a capturing set value related to time-lapse photography is input, one or more capturing set values different from the inputted capturing set value is calculated based on the inputted capturing set value, a battery usage amount or a memory usage amount (S220).

For this, screen information (user interface) for setting capturing set values related to time-lapse photography may be output. The screen information may be output before time-lapse photography starts, or while time-lapse photography is being executed.

In an embodiment, if a battery or memory usage amount to be used for time-lapse photography is input, one or more capturing set values for time-lapse photography may be calculated based on the inputted battery or memory usage amount.

If a capturing set value rather than a battery usage amount or a memory usage amount to be used for time-lapse photography is input, one or more capturing set values for time-lapse photography may be calculated based on a battery usage amount or a memory usage amount.

In an embodiment, an entire capturing time, a capturing time interval, an FPS, a shutter speed, an image brightness, an image resolution, an image size, an image ratio, etc. may be calculated. Here, FPS (Frames Per Second) is the number of frames recorded per second.

The controller 180 may calculate at least one of an entire capturing time, a capturing time interval, an FPS, a shutter speed, an image brightness, an image resolution, an image size and an image ratio, based on a battery usage amount or a memory usage amount, as the one or more capturing set values.

Figure 3:
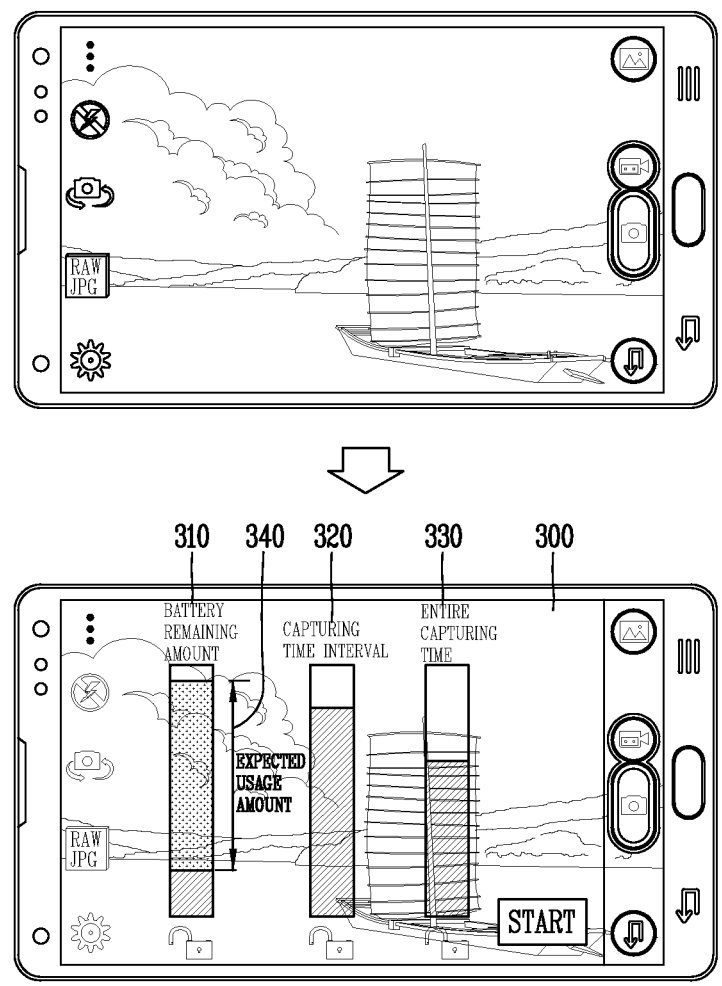
FIG. 3 is a conceptual view illustrating an embodiment to output screen information for setting a battery usage amount or a memory usage amount to be used for time-lapse photography.

FIG. 3 is a conceptual view illustrating an embodiment to output screen information for setting a capturing set value related to time-lapse photography.

Referring to FIG. 3, screen information 300 for setting a capturing set value related to time-lapse photography may be output when time-lapse photography starts.

Alternatively, in case of selecting an environment setting (option setting) menu before time-lapse photography, screen information 300 for setting a capturing set value related to time-lapse photography may be output.

In an embodiment, the screen information 300 may be output as an upper layer of a preview image of an image being captured by time-lapse photography. In this case, the preview image may be viewed unclearly, since the upper layer has been set in an opaque state.

In another embodiment, the screen information 300 may include a battery remaining amount 310, a capturing time interval 320, an entire capturing time 330, etc. More specifically, the battery remaining amount 310, the capturing time interval 320, the entire capturing time 330, etc. may be displayed in the form of bar graphs.

The capturing time interval 320 and the entire capturing time 330 may be calculated, based on an expected usage amount 340 to be used for time-lapse photography, among a battery remaining amount.

The expected usage amount 340 may be a value obtained by deducting an amount required to maintain a minimum function of the mobile terminal 100 from the battery remaining amount, or may be calculated based on a value which has been previously used for time-lapse photography, or a value which has been frequently used for time-lapse photography, etc.

The controller 180 may calculate a threshold value(s) of the one or more capturing set values, based on at least one of a battery usage amount and a memory usage amount.

In an embodiment, if a user's input to increase or decrease a battery or memory usage amount to be used for the time-lapse photography is received, the controller 180 may calculate at least one of the capturing time interval 320 and the entire capturing time 330, based on the increased or decreased battery or memory usage amount.

Figure 4:
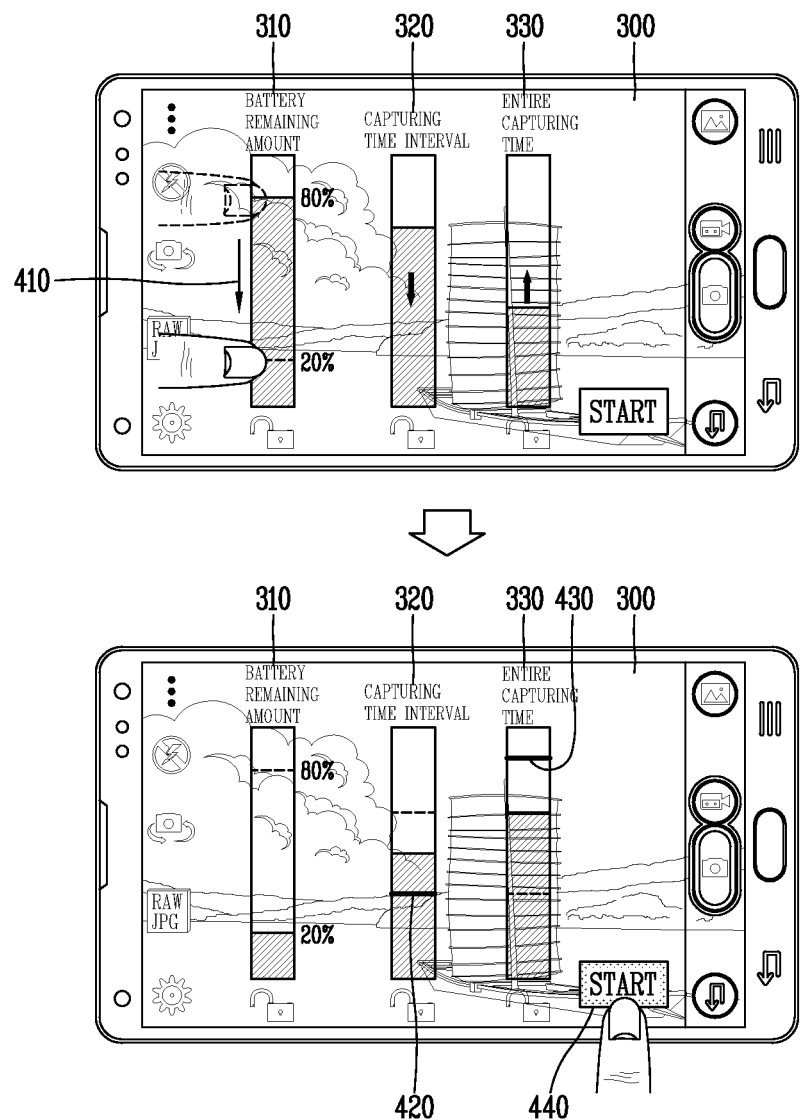
FIG. 4 is a conceptual view illustrating an embodiment to set a battery usage amount to be used for time-lapse photography.

FIG. 4 is a conceptual view illustrating an embodiment to set a battery usage amount to be used for time-lapse photography.

Referring to FIG. 4, as aforementioned with reference to FIG. 3, the screen information 300 for setting a capturing set value related to time-lapse photography may include a battery remaining amount 310, a capturing time interval 320, an entire capturing time 330, etc. More specifically, the battery remaining amount 310, the capturing time interval 320, the entire capturing time 330, etc. may be displayed in the form of bar graphs.

In an embodiment, a user may set a battery usage amount (consumption amount) to be used for time-lapse photography, by applying a drag input 410 to the battery remaining amount 310. More specifically, the user may downward apply the drag input 410 such that the battery remaining amount 310 may be 20% from 80%. That is, 60% among the battery remaining amount is usable for time-lapse photography.

Accordingly, the capturing time interval 320 and the entire capturing time 330 may be calculated based on the battery usage amount (60%) used for time-lapse photography. In an embodiment, the capturing time interval 320 may be reduced, and the entire capturing time 330 may be increased.

A threshold value 420 may be displayed on the bar graph of the capturing time interval 320, and a threshold value 430 may be displayed on the bar graph of the entire capturing time 330. In an embodiment, the respective threshold values 420, 430 may be preset, or may be calculated based on the current battery remaining amount (80%).

The capturing time interval 320 and the entire capturing time 330 may be calculated within the range of the respective threshold values 420, 430. More specifically, the capturing time interval 320 may not be set to be smaller than the threshold value 420, and the entire capturing time 330 may not be set to be larger than the threshold value 430.

A user may start time-lapse photography based on the set values, by applying a touch input to a start icon 440. Alternatively, the user may apply an input for controlling the capturing set values 320, 330.

The controller 180 may control one capturing set value selected by the user among the one or more capturing set values, to be maintained. And the controller 180 may calculate the remaining capturing set value(s), based on the battery or memory usage amount and the maintained capturing set value.

Figure 5:
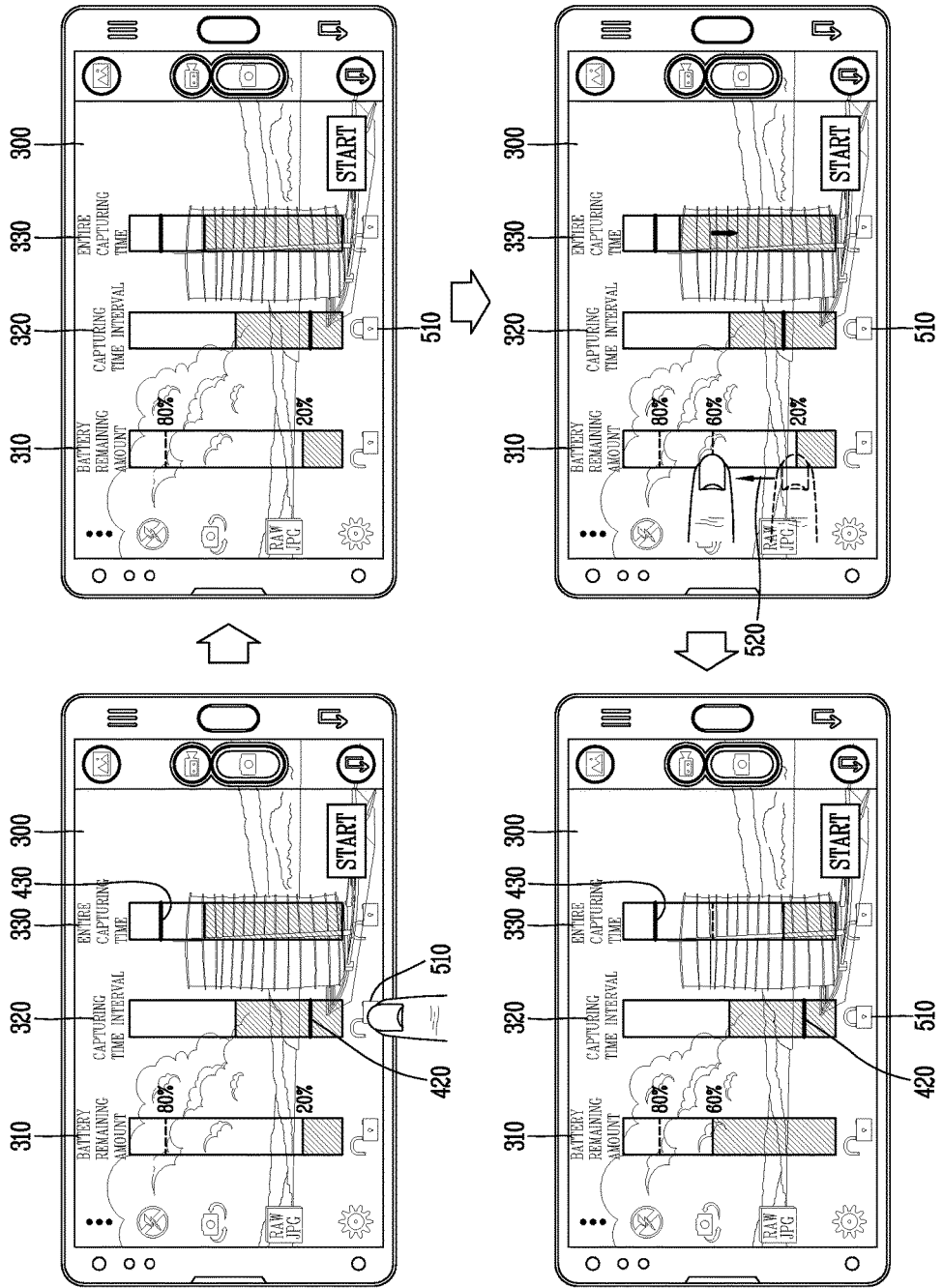
FIG. 5 is a conceptual view illustrating an embodiment to fix part of capturing set values.

FIG. 5 is a conceptual view illustrating an embodiment to fix part of capturing set values.

Referring to FIG. 5, as aforementioned with reference to FIG. 4, in the state where the battery usage amount (60%) has been set (battery remaining amount: 20%), a user may apply a touch input to a lock icon 510 such that the capturing time interval 320 may be constantly maintained. In this case, the lock icon 510 with respect to the capturing time interval 320 is transformed to a locked state from an open state.

Then, the user may upward apply a drag input 520 to the bar graph of the battery remaining amount 310, thereby increasing the battery remaining amount to 60%. That is, the battery usage amount to be used for time-lapse photography is reduced to 20%.

As a result, the capturing time interval 320 set to have a fixed value is constantly maintained, and the entire capturing time 330 is reduced. More specifically, the entire capturing time 330 may be calculated based on the battery usage amount (20%) and the fixed capturing time interval 320.

As aforementioned with reference to FIG. 4, the user may start time-lapse photography based on the set values, by applying a touch input to the start icon 440. Alternatively, the user may apply an input for controlling the capturing set values 320, 330.

Figure 6:
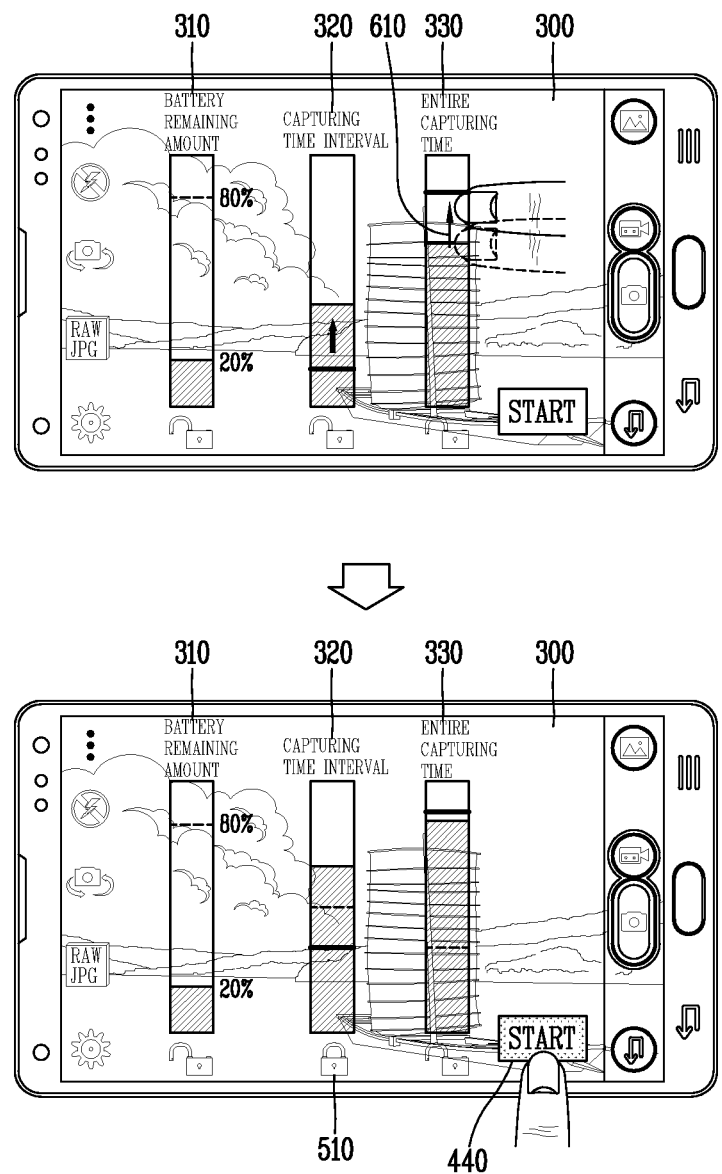
FIG. 6 is a conceptual view illustrating an embodiment to set one or more capturing set values by applying a touch input to the capturing set value.

FIG. 6 is a conceptual view illustrating an embodiment to set one or more capturing set values by applying a touch input to the capturing set value.

Referring to FIG. 6, as aforementioned with reference to FIG. 4, in the state where the battery usage amount (60%) has been set (battery remaining amount: 20%), a user may upward apply a drag input 610 to the bar graph of the entire capturing time 330. As a result, the entire capturing time 330 may be increased.

As the entire capturing time 330 is increased, the capturing time interval 320 may be changed. In an embodiment, the capturing time interval 320 may be increased based on the set battery usage amount (60%).

The values indicated by the respective bar graphs are influenced from each other. That is, as the entire capturing time 330 is changed, the capturing time interval 320 is also changed. Likewise, if the capturing time interval 320 is changed, the entire capturing time 330 is also changed.

The capturing set values 320, 330 may be changed within the range of the respective threshold values 420, 430.

Figure 7:
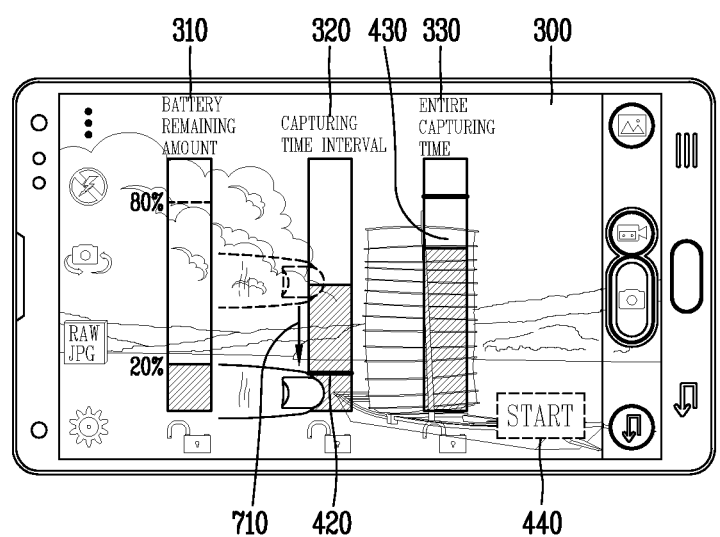
FIG. 7 is a conceptual view illustrating an embodiment to control capturing set values by considering threshold values.

FIG. 7 is a conceptual view illustrating an embodiment to control capturing set values by considering threshold values.

Referring to FIG. 7, as aforementioned with reference to FIG. 4, in the state where the battery usage amount (60%) has been set (battery remaining amount: 20%), a user may apply a drag input 710 for setting the capturing time interval 320 to a value less than the threshold value 420. In this case, the start icon 440 for time-lapse photography may be converted into an inactivated state (i.e., a non-selectable state).

In another embodiment, may be output a message indicating that the capturing time interval 320 has been set to the threshold value 420 or is out of the range of the threshold value 420. In this case, the mobile terminal may return to the original state. That is, the state before the drag input 710 is input may be output.

In another embodiment, a drag input may be upward applied again such that the capturing time interval 320 may be within the range of the threshold value 420. In this case, the start icon 440 may be converted into an activated state.

A memory usage amount to be used for time-lapse photography may be set, and the remaining capturing set values may be calculated.

FIG. 8 is a conceptual view illustrating an embodiment to set a memory usage amount to be used for time-lapse photography.

Referring to FIG. 8, screen information 300 for setting a battery usage amount or a memory usage amount to be used for time-lapse photography may include a memory remaining amount 810, a capturing time interval 820, an entire capturing time 830, a battery remaining amount 840, etc. More specifically, the memory remaining amount 810, the capturing time interval 820, the entire capturing time 830 and the battery remaining amount 840 may be displayed in the form of bar graphs.

In an embodiment, a user may set a memory usage amount (consumption amount) to be used for time-lapse photography, by applying a drag input 850 to the memory remaining amount 810. More specifically, the user may downward apply the drag input 850 such that the memory remaining amount 810 may be 0.5 G from 3.5 G. That is, 3 G among the memory remaining amount is usable for time-lapse photography.

Accordingly, the capturing time interval 820 and the entire capturing time 830 may be calculated based on the memory usage amount (3 G) used for time-lapse photography. In an embodiment, the battery remaining amount 840 may be a fixed value, the capturing time interval 820 may be reduced, and the entire capturing time 830 may be increased.

A threshold value 860 may be displayed on the bar graph of the capturing time interval 820, and a threshold value 870 may be displayed on the bar graph of the entire capturing time 830. In an embodiment, the respective threshold values 860, 870 may be preset, or may be calculated based on the current memory remaining amount (3.5 G).

The capturing time interval 820 and the entire capturing time 830 may be calculated within the range of the respective threshold values 860, 870. More specifically, the capturing time interval 820 may not be set to be smaller than the threshold value 860, and the entire capturing time 830 may not be set to be larger than the threshold value 870.

A user may start time-lapse photography based on the set values, by applying a touch input to a start icon 440. Alternatively, the user may apply an input for controlling the capturing set values 820, 830.

The controller 180 may recommend the one or more capturing set values for time-lapse photography, by preset capturing object.

FIG. 9 is a conceptual view illustrating an embodiment to recommend a capturing set value by capturing object.

Referring to FIG. 9, when time-lapse photography starts, screen information 900 to recommend capturing set values for time-lapse photography may be output according to a type of a subject.

Alternatively, when a recommended menu (icon) is selected before time-lapse photography, the screen information 900 to recommend capturing set values for time-lapse photography may be output according to a type of a subject.

In an embodiment, a time interval for time-lapse photography, the number of frames per second, a shutter speed, a capturing time, etc. may be recommended by subject. The subject may be implemented in various manners. For instance, the subject may be a city, a plant, a cloud, an animal, etc.

With such a configuration, a user may automatically set capturing set values for time-lapse photography, by applying a touch input to his or her desired recommendation list.

If a preset user's input is received during the time-lapse photography, the controller 180 may output screen information for changing one or more capturing set values for the time-lapse photography.

In an embodiment, if a touch input is applied to a specific icon during time-lapse photography, the screen information 300 (refer to FIG. 3) for changing one or more capturing set values for time-lapse photography may be output.

With such a configuration, like in the aforementioned embodiments, the battery or memory remaining amount is controlled even during time-lapse photography, so the capturing time interval or the entire capturing time may be reset. Likewise, a threshold value of each bar graph may be output, and part of the threshold values may be set as a fixed value.

The controller 180 may output screen information for changing one or more capturing set values for the time-lapse photography, if the remaining battery or memory usage amount is reduced to a value less than a preset value, or if it is determined that the time-lapse photography based on the current capturing set values is not executable with the battery or memory usage amount.

FIG. 10 is a conceptual view illustrating an embodiment to output a screen for resetting capturing set values when a battery usage amount is deficient during time-lapse photography.

Referring to FIG. 10, if a battery usage amount is reduced to a value less than a preset value during time-lapse photography, a message pop-up window 1000 inquiring whether to reset capturing set values or not may be output.

In an embodiment, if the battery usage amount is reduced to a value less than a predetermined value set before time-lapse photography, the message pop-up window 1000 inquiring whether to reset capturing set values or not may be output.

As a user selects for resetting, screen information 300 for changing one or more capturing set values for time-lapse photography may be output. The screen information 300 may include a memory remaining amount 1010, a capturing time interval 1020, an entire capturing time 1030, a battery remaining amount 1040, etc. More specifically, the battery remaining amount 1010, the capturing time interval 1020, the entire capturing time 1030 and the memory remaining amount 1040 may be displayed in the form of bar graphs indicating set values.

Then, like in the aforementioned embodiments, a drag input may be applied to each set value upward or downward for resetting. As a result, a threshold value of each set value may be displayed on each bar graph.

In an embodiment, if a drag input is upward applied to the entire capturing time 1030, the capturing time interval 1020 is increased. And part of the capturing set values may be maintained as a touch input is applied to each lock icon.

In another embodiment, guide information which considers a remaining battery usage amount may be output.

More specifically, if the entire capturing time is maintained, guide information for inducing increase of the capturing time interval may be output, based on a remaining battery amount. On the other hand, if the capturing time interval is maintained, guide information for inducing decrease of the entire capturing time may be output, based on the remaining battery amount.

Alternatively, may be output guide information to execute time-lapse photography with maintaining the entire capturing time or the capturing time interval, by reducing an image resolution, an image size, or an image ratio.

Figure 11:
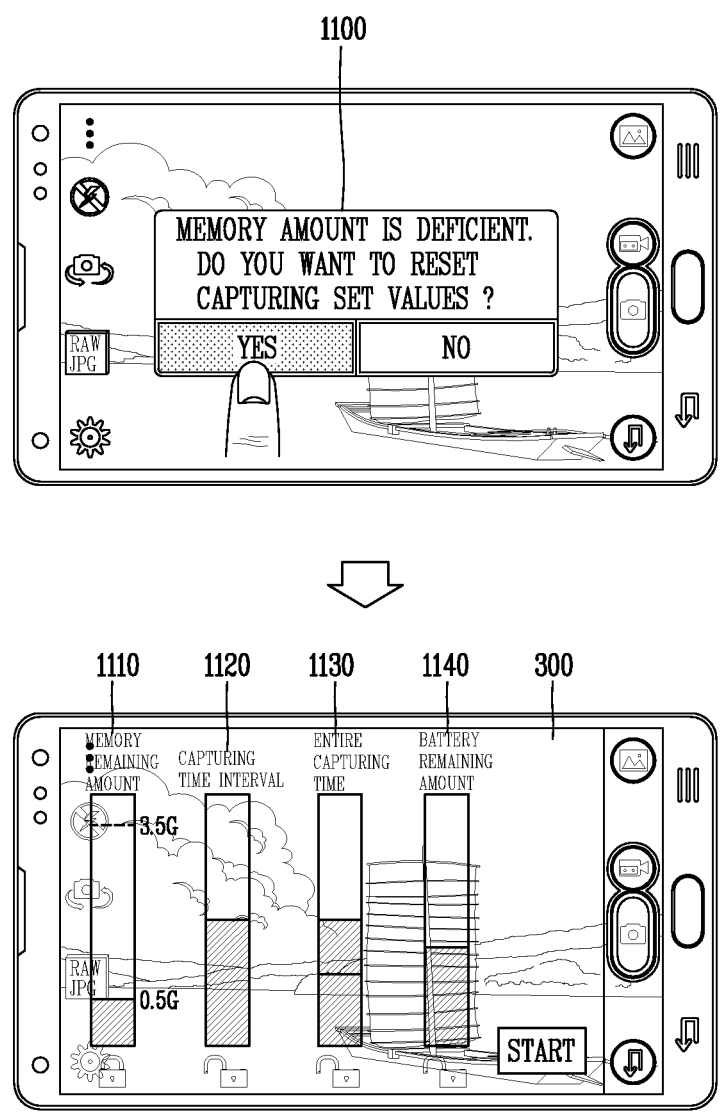
FIG. 11 is a conceptual view illustrating an embodiment to output a screen for resetting capturing set values when a memory usage amount is deficient during time-lapse photography.

FIG. 11 is a conceptual view illustrating an embodiment to output a screen for resetting capturing set values when a memory usage amount is deficient during time-lapse photography.

Referring to FIG. 11, if a memory usage amount is reduced to a value less than a preset value during time-lapse photography, a message pop-up window 1100 inquiring whether to reset capturing set values or not may be output.

In an embodiment, if the memory usage amount is reduced to a value less than a predetermined value set before time-lapse photography, the message pop-up window 1100 inquiring whether to reset capturing set values or not may be output.

As a user selects for resetting, screen information 300 for changing one or more capturing set values for time-lapse photography may be output. The screen information 300 may include a memory remaining amount 1110, a capturing time interval 1120, an entire capturing time 1130, a battery remaining amount 1140, etc. More specifically, the memory remaining amount 1110, the capturing time interval 1120, the entire capturing time 1130 and the battery remaining amount 1140 may be displayed in the form of bar graphs indicating set values.

Then, like in the aforementioned embodiments, a drag input may be applied to each set value upward or downward for resetting. As a result, a threshold value of each set value may be displayed on each bar graph.

In an embodiment, if a drag input is upward applied to the entire capturing time 1130, the capturing time interval 1120 is increased. And some of the capturing set values may be maintained as a touch input is applied to each lock icon.

In another embodiment, guide information which considers a remaining memory usage amount may be output.

More specifically, if the entire capturing time is maintained, guide information for inducing increase of the capturing time interval may be output, based on a remaining memory amount. On the other hand, if the capturing time interval is maintained, guide information for inducing decrease of the entire capturing time may be output, based on the remaining memory amount. Alternatively, may be output guide information to execute time-lapse photography with maintaining the entire capturing time or the capturing time interval, by reducing an image resolution, an image size, or an image ratio.

If a preset capturing state is sensed during the time-lapse photography, the controller 180 may output screen information for changing one or more capturing set values for the time-lapse photography.

Figure 12:
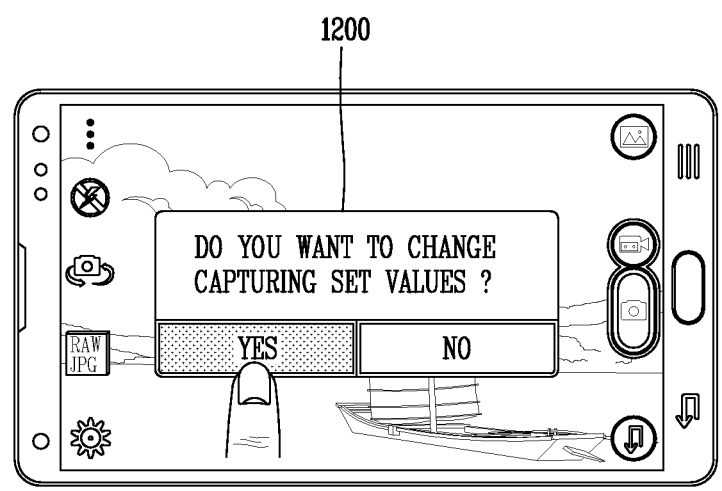
FIG. 12 is a conceptual view illustrating an embodiment to output a screen for resetting capturing set values, if quality of an image is degraded during time-lapse photography.

FIG. 12 is a conceptual view illustrating an embodiment to output a screen for resetting capturing set values, if quality of an image is degraded during time-lapse photography.

Referring to FIG. 12, if quality of an image is degraded during time-lapse photography, a pop-up window 1200 inquiring whether to reset capturing set values or not may be output.

In an embodiment, the pop-up window 1200 inquiring whether to reset capturing set values or not may be output, when a motion is sensed during time-lapse photography, when a focal point is not aligned, when an illumination value is lowered to a predetermined value, when the same screen is continuously captured or a preset time, etc.

If a preset user's input is applied during the time-lapse photography, the controller 180 may output an opaque upper layer which blocks an image being captured by the time-lapse photography, with a preset brightness.

In an embodiment, if a preset user's input is applied during the time-lapse photography, the controller 180 may output the upper layer and then may output capturing information related to the time-lapse photography to the upper layer.

Figure 13:
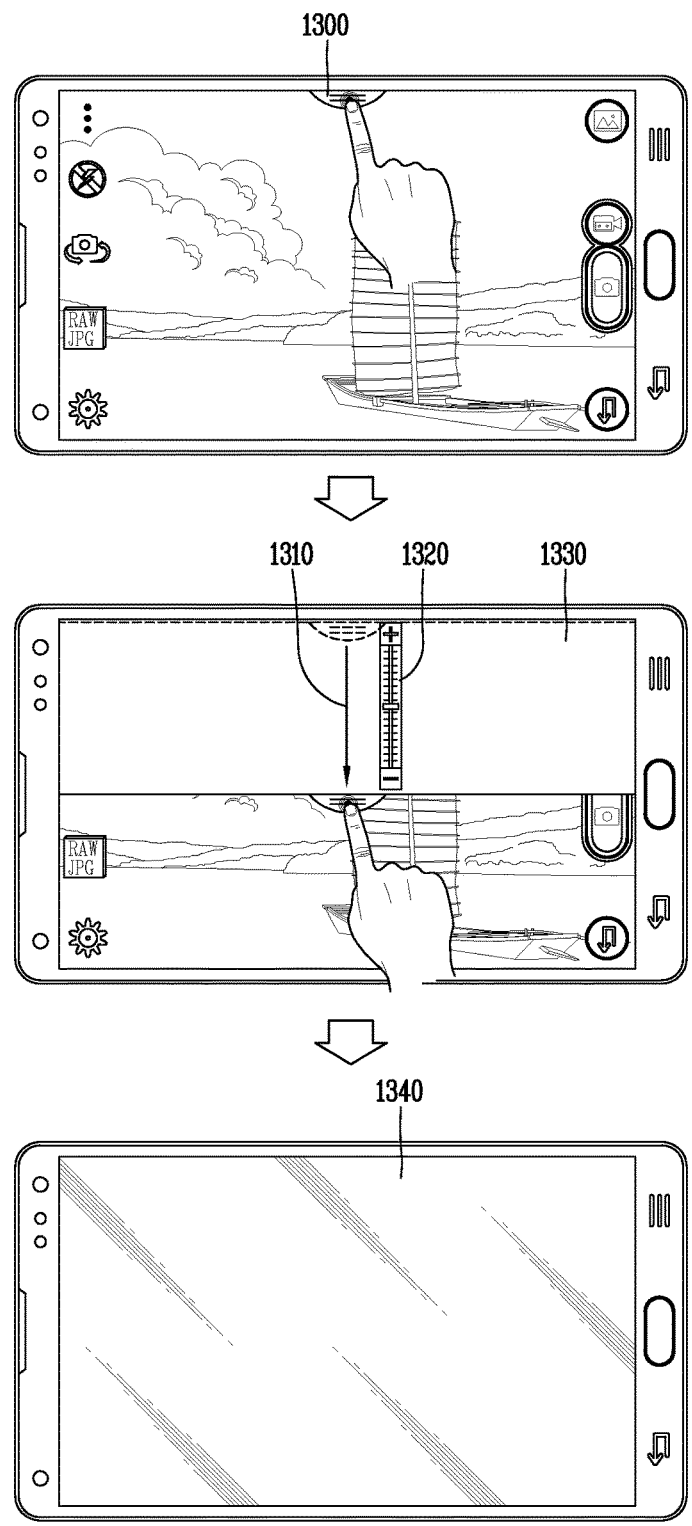
FIG. 13 is a conceptual view illustrating an embodiment to output an upper layer to a preview image of an image being captured by time-lapse photography.

FIG. 13 is a conceptual view illustrating an embodiment to output an upper layer to a preview image of an image being captured by time-lapse photography.

Referring to FIG. 13, a specific object 1300 may be output to an upper end of the display unit 151 during time-lapse photography. In an embodiment, if a predetermined time lapses after the time-lapse photography, the icon 1300 of a handle shape may be output to the upper end of the display unit 151.

Then, if a drag input 1310 is downward applied to the icon 1300, an opaque upper layer 1330 which blocks an image being captured by the time-lapse photography with a preset brightness, may be output up to a point where the drag input 1310 has been applied, along the drag input 1310.

In an embodiment, the upper layer 1330 may be a black layer which blocks an image being captured by the time-lapse photography. That is, a region to which the drag input 1310 has been applied may be output in a deactivated state ('off' state).

Even in this state, the time-lapse photography may be continuously executed. And the touch sensor may be in an activated state. Thus, a touch input applied to the black upper layer may be sensed.

As the display unit 151 is output in a deactivated state ('off' state) while time-lapse photography is executed for a long time, unnecessary battery consumption may be reduced.

In another embodiment, the display 151 may be converted into a deactivated state ('off' state). That is, the display 151 may not be blocked by the black upper layer, but may be substantially converted into a deactivated state. This may reduce unnecessary battery consumption. In this case, the touch sensor may maintain an activated state.

In another embodiment, an indicator 1320 indicating a brightness degree of the upper layer 1330 may be output to the upper layer 1330. The brightness degree of the indicator 1320 may be controlled according to a length of the drag input 1310.

More specifically, if a drag input is downward applied to the icon 1300 of a handle shape up to a middle region of the display unit 151 and then the finger is detached from the display unit 151, the entire display unit 151 may be blocked by an opaque black upper layer. On the other hand, if a drag input is downward applied to the icon 1300 of a handle shape up to a lower end of the display unit 151 and then the finger is detached from the display unit 151, the entire display unit 151 may be blocked by the opaque black upper layer 1340.

That is, the upper layer 1340 which blocks the entire display unit 151 may be set to have a low brightness (a dark color), in proportion to a length of the drag input.

In another embodiment, a drag input may be downward applied to the icon 1300 of a handle shape to output a bar 1320 indicating a brightness degree of the upper layer 1330. Then, a drag input may be applied to the bar 1320 upward or downward, thereby controlling the brightness degree of the upper layer 1330.

In another embodiment, the upper layer 1330 may block part of the image being captured by time-lapse photography, only up to a region to which a drag input has been applied. More specifically, if the finger which has applied the drag input 1310 is detached from the display unit, the upper layer 1330 may be output to block up to a region where the finger has been detached. A brightness degree of the black upper layer 1330 may be preset, or may be set as a drag input is applied to the bar 1320 upward or downward.

Even when the upper layer blocks the image being captured by time-lapse photography partially or wholly, the time-lapse photography may be continuously executed.

Figure 14:
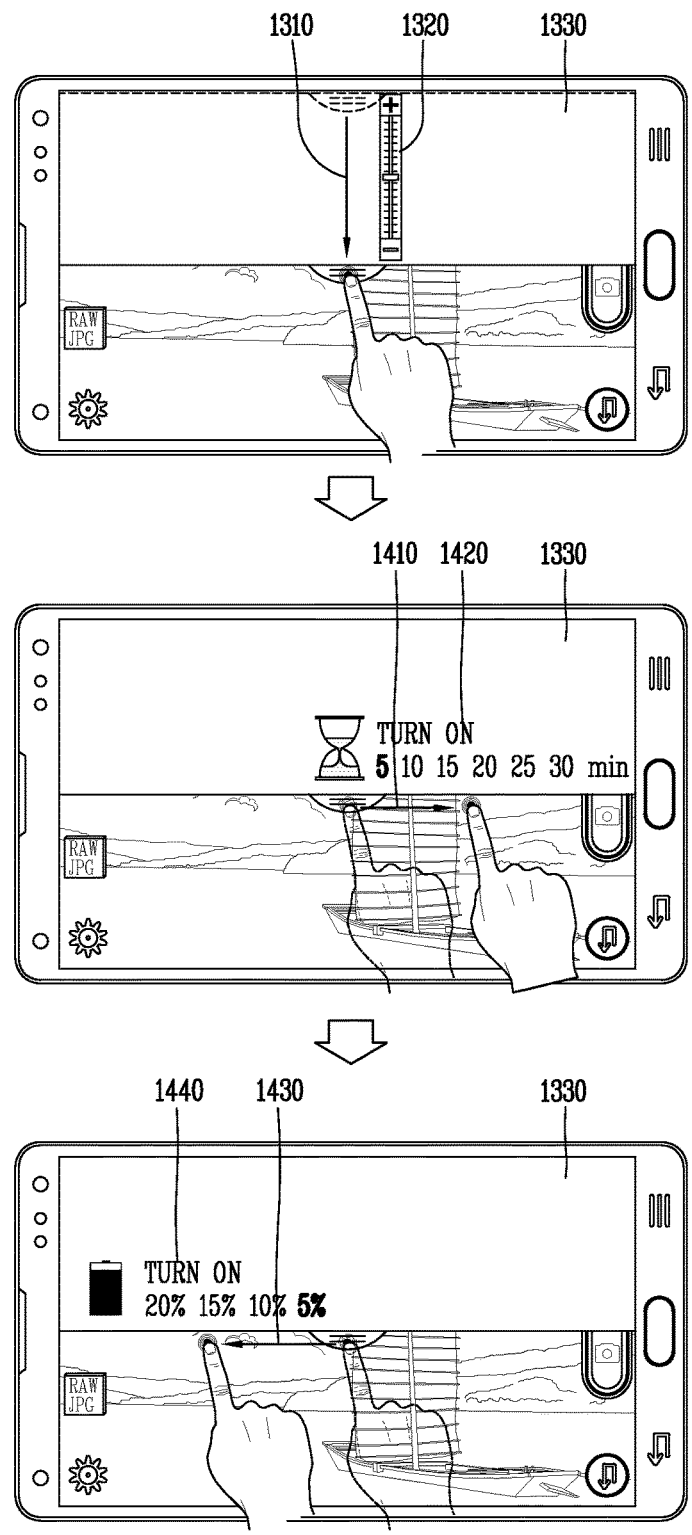
FIG. 14 is a conceptual view illustrating an embodiment to output an upper layer and capturing information.

FIG. 14 is a conceptual view illustrating an embodiment to output an upper layer and capturing information.

Referring to FIG. 14, as aforementioned with reference to FIG. 13, a drag input 1310 is downward applied to output a black upper layer 1330, up to a region where the drag input 1310 has been applied.

In this case, if the finger which has applied the drag input 1310 applies a drag input 1410 to the right without being detached from the display unit, time information 1420 related to an output period of the upper layer 1330 may be output to the upper layer 1330.

More specifically, if 15-minute is selected from the time information 1420 in a touched or dragged manner, the black upper layer may disappear to be re-output per 15 minutes. That is, as a transparent degree of the upper layer 1330 is increased, a preview image of an image being captured may be output temporarily.

In another embodiment, if the finger which has applied the drag input 1310 applies a drag input 1430 to the left without being detached from the display unit, battery information 1440 related to termination of an output state of the upper layer 1330 may be output to the upper layer 1330.

More specifically, if 5% is selected from the battery information 1440 in a touched or dragged manner, the black upper layer may disappear when a battery amount is 5%.

Even when the upper layer blocks an image being captured by time-lapse photography partially, the time-lapse photography may be continuously executed.

Figure 15:
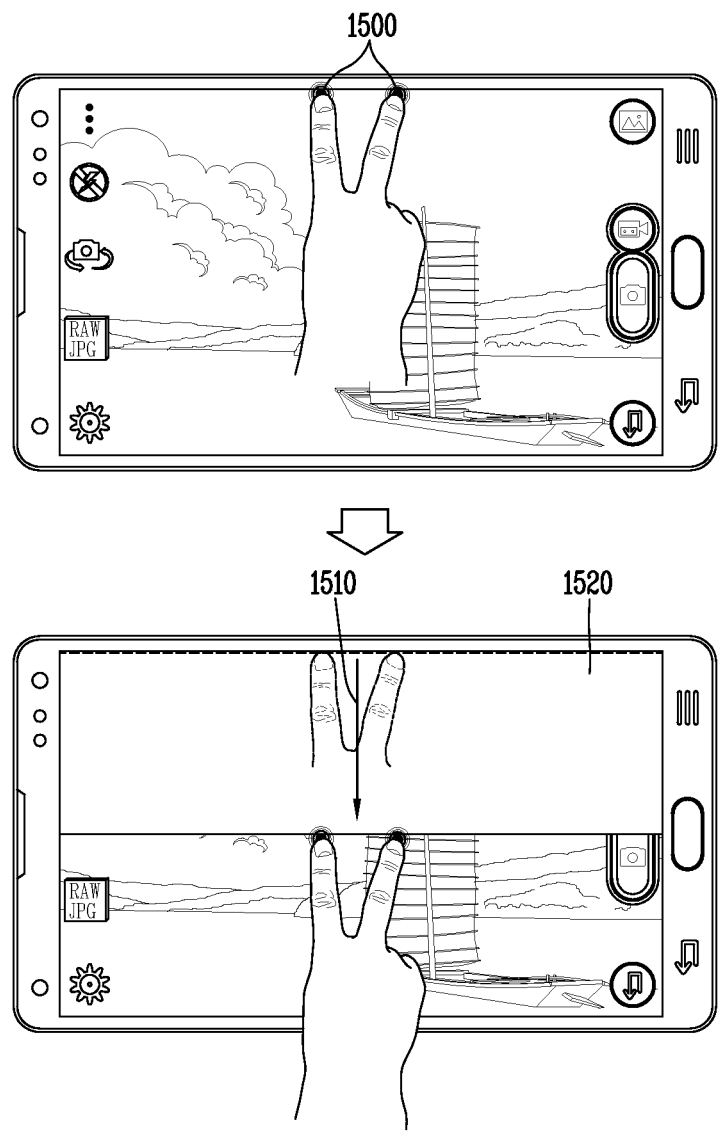
FIG. 15 is a conceptual view illustrating an embodiment to output an upper layer by a multi-touch input.

FIG. 15 is a conceptual view illustrating an embodiment to output an upper layer by a multi-touch input.

Referring to FIG. 15, a touch input 1500 may be applied to an upper end of the display unit 151 by two fingers during time-lapse photography. Then, a drag input 1510 may be applied downward. In an embodiment, a drag input may be downward applied to a notification region by two fingers.

A black upper layer 1520 which blocks an image being captured by time-lapse photography may be output along the drag input 1510, up to a region where the drag input 1510 has been applied. Even when the upper layer blocks the image being captured by time-lapse photography partially, the time-lapse photography may be continuously executed.

If a preset user's input is applied to the upper layer, the controller 180 may output a preview image of the image, to the upper layer.

Figure 16:
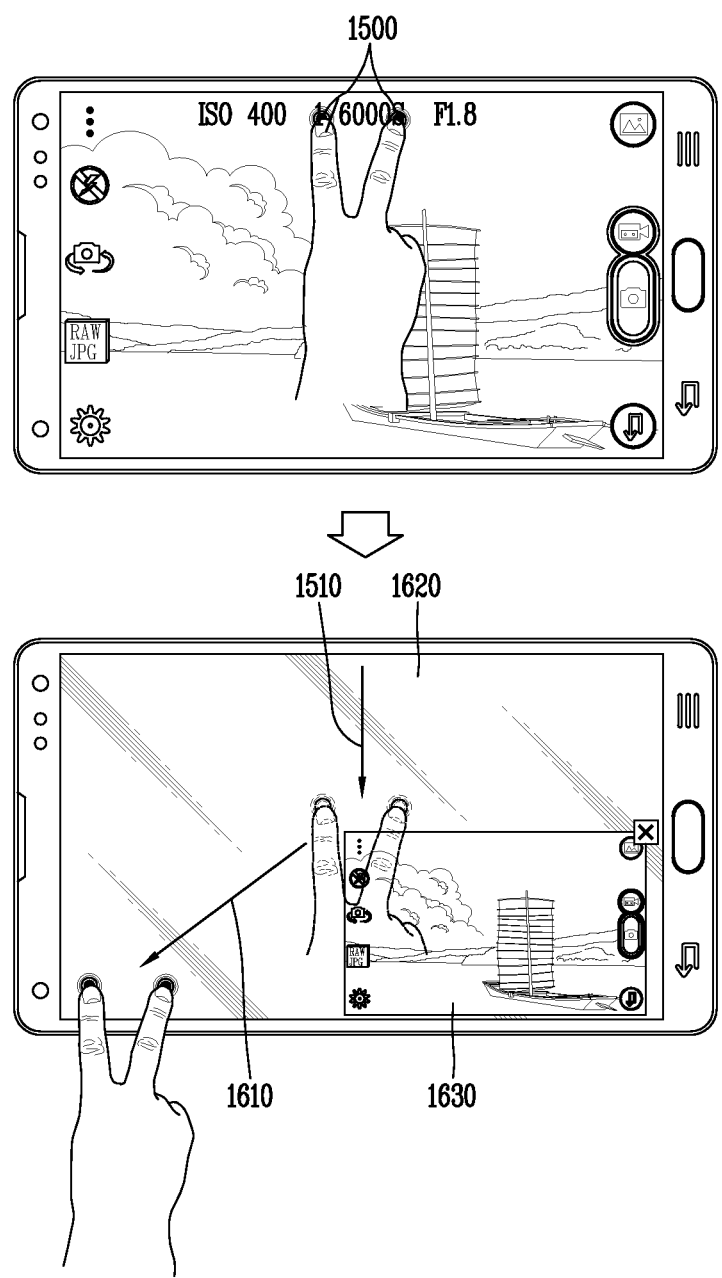
FIG. 16 is a conceptual view illustrating an embodiment to output an upper layer, and a preview image of an image being captured, by a multi-touch input.

FIG. 16 is a conceptual view illustrating an embodiment to output an upper layer, and a preview image of an image being captured, by a multi-touch input.

Referring to FIG. 16, a touch input 1500 may be applied to an upper end of the display unit 151 by two fingers during time-lapse photography. Then, a drag input 1510 may be applied downward.

In an embodiment, a drag input may be downward applied to a notification region by two fingers. The notification region may be a region where information related to time-lapse photography is output. More specifically, the information may include an ISO related to time-lapse photography, an AF, and a capturing set value such as a capturing time.

After the drag input 1510 has been applied, a drag input 1610 may be consecutively applied to a left lower region. As a result, a black upper layer 1620 which blocks an image being captured by time-lapse photography may be output. A preview image 1630 of the image may be output to a right lower region of the upper layer 1620 with a small size.

In another embodiment, a touch input 1500 may be applied to an upper end of the display unit 151 by two fingers during time-lapse photography. Then, a drag input 1510 may be applied downward. In an embodiment, a drag input may be downward applied to a notification region by two fingers.

After the drag input 1510 has been applied, a drag input may be consecutively applied to a right lower region. As a result, the black upper layer 1620 which blocks the image being captured by time-lapse photography, may be output. A preview image 1630 of the image may be output to a left lower region of the upper layer 1620 with a small size.

Figure 17:
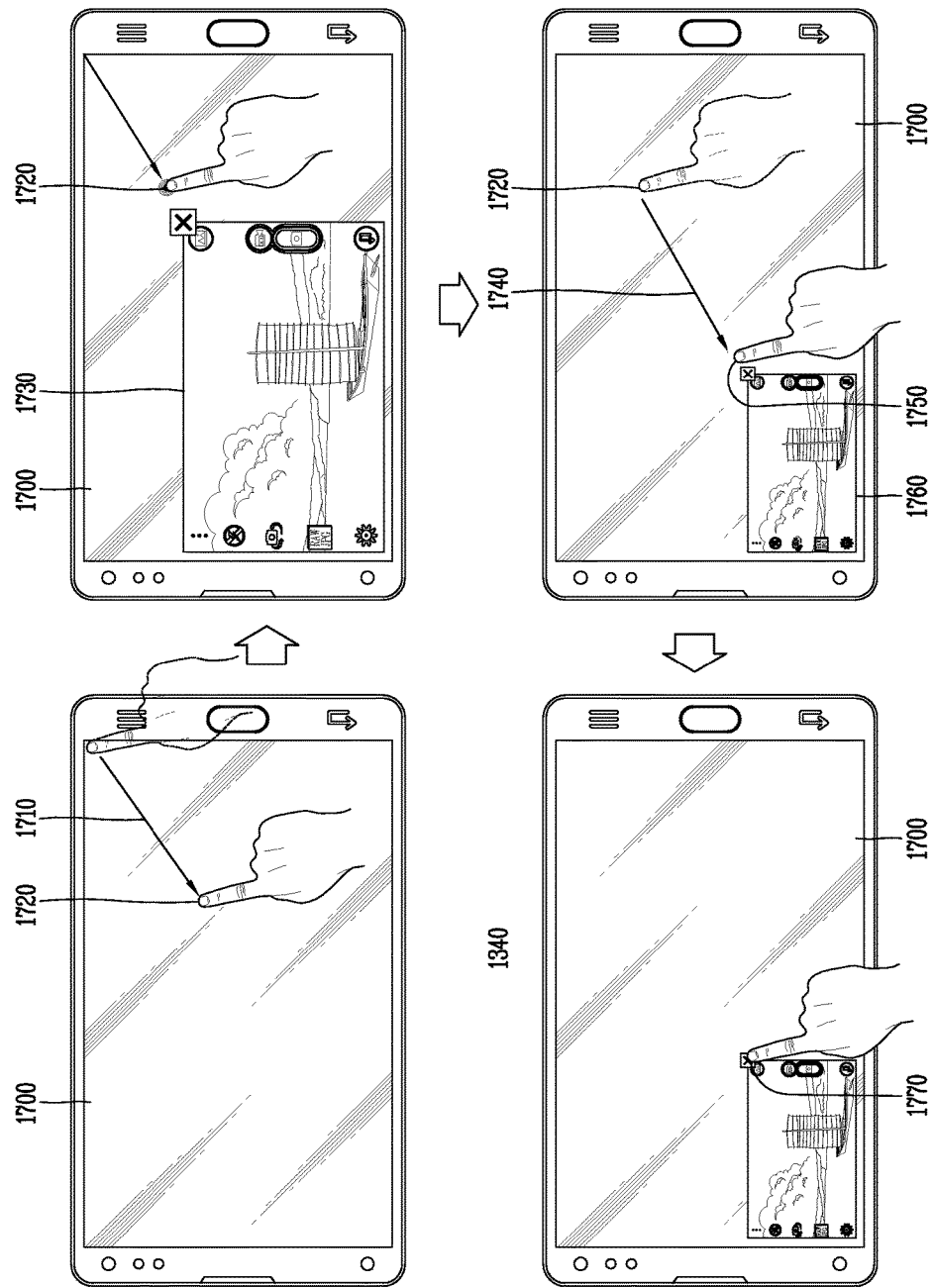

FIG. 17 is a conceptual view illustrating an embodiment to temporarily output a preview image of an image being captured, to an upper layer, by a drag input.

Referring to FIG. 17, in the aforementioned embodiments, when a black upper layer 1700 which blocks an image being captured by time-lapse photography is output, a drag input 1710 may be applied up to a first point 1720 from a right corner region to a central region.

As a result, a preview image 1730 of the image being captured by time-lapse photography may be output to a left lower region of the upper layer 1700. In this case, a size of the preview image 1730 may be set such that a corner region of the preview image 1730 may be positioned at the first point 1720 or at an inner side than the first point 1720.

Then, a user may apply a drag input 1740 up to a second point 1750 toward a central region of the display unit 151, without detaching the finger which is on the first point 1720 from the display unit 151. As a result, the size of the preview image 1730 may be set such that a corner region of the preview image 1730 may be positioned at the second point 1750 or at an inner side than the second point 1750. That is, a preview image 1760 may be output to a left lower region of the upper layer 1700 with a small size.

In another embodiment, if the user applies a drag input to a right corner region without detaching the finger which is on the second point 1750 from the display unit 151, the size of the preview image may be increased.

As a drag input is applied toward the central region or the right upper corner region of the display unit 151, the size of the preview image output to the upper layer 1700 may be controlled.

In another embodiment, if the finger which has applied the drag input is detached from the display unit 151, the output state of the preview image may be maintained. Then, the preview image may disappear when a touch input is applied to a closing icon 1770 output to a corner region of the preview image.

In another embodiment, when the black upper layer 1700 which blocks an image being captured by time-lapse photography is output, a drag input may be applied toward an inner region of the display unit 151 from a left corner region of the display unit 151. As a result, a preview image of the image may be output to a right lower region.

As a drag input is applied toward a central region or a left upper corner region of the display unit 151, the size of the preview image output to the upper layer 1700 may be controlled.

If a preset user's input is applied to the upper layer, the controller 180 may output a preview image of the image by increasing a transparent degree of the upper layer.

FIG. 18 is a conceptual view illustrating another embodiment to temporarily output a preview image of an image being captured, to an upper layer, by a drag input.

Referring to FIG. 18, in the aforementioned embodiments, when a black upper layer 1800 which blocks an image being captured by time-lapse photography is output, a drag input 1810 may be applied to the left or to the right.

As a result, while the drag input is maintained, a transparent degree of the upper layer 1800 is increased, and the image being captured by time-lapse photography is seen. Then, if the drag input is released, the transparent degree of the upper layer 1800 is reduced to block the image.

In another embodiment, when the black upper layer 1800 which blocks an image being captured by time-lapse photography is output, a multi-touch input may be applied. In this case, the image being captured by time-lapse photography may be output as a transparent degree of the upper layer 1800 is increased.

More specifically, if a touch input using two fingers is applied to the black upper layer 1800 which blocks an image being captured by time-lapse photography, the image may be output as a transparent degree of the upper layer 1800 is increased. Then, if the touch input using two fingers is released, the transparent degree of the upper layer 1800 is reduced to block the image.

If a preset user's input is applied to the upper layer, the controller 180 may control the upper layer to disappear.

Figure 19:
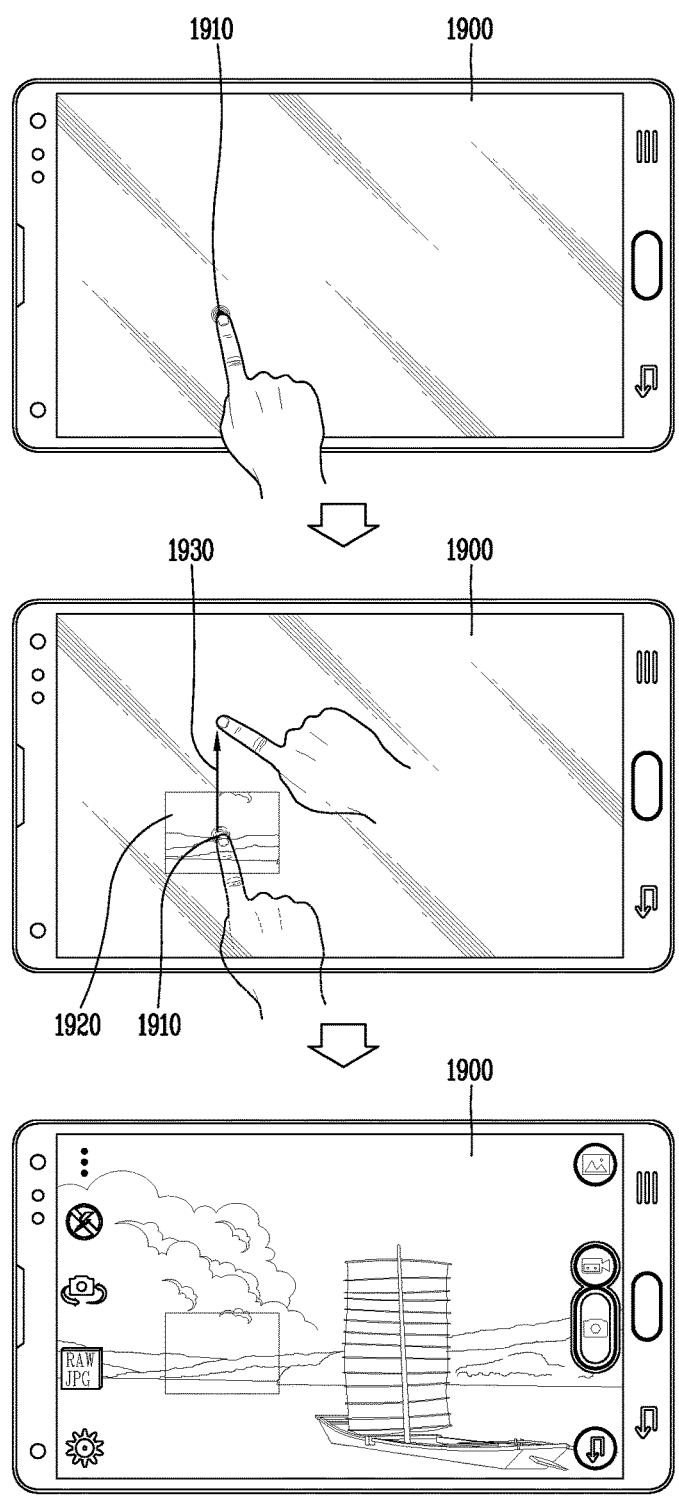
FIG. 19 is a conceptual view illustrating an embodiment to terminate an output state of an upper layer.

FIG. 19 is a conceptual view illustrating an embodiment to terminate an output state of an upper layer.

Referring to FIG. 19, when a black upper layer 1900 which blocks an image being captured by time-lapse photography is output, a long touch input may be applied to one region 1910.

As a result, part 1920 of the image being captured by time-lapse photography, which corresponds to the one region 1910, may be output. In an embodiment, as a transparent degree of the one region 1910 is increased, the part 1920 of the image blocked by the upper layer 1900 may be output.

Then, if a swipe input 1930 is applied upward or downward, the upper layer 1900 may disappear. As a result, a preview image of the image being captured by time-lapse photography may be output.

The controller 180 may output the preview image of the image being captured to the upper layer, at preset time intervals.

Figure 20:
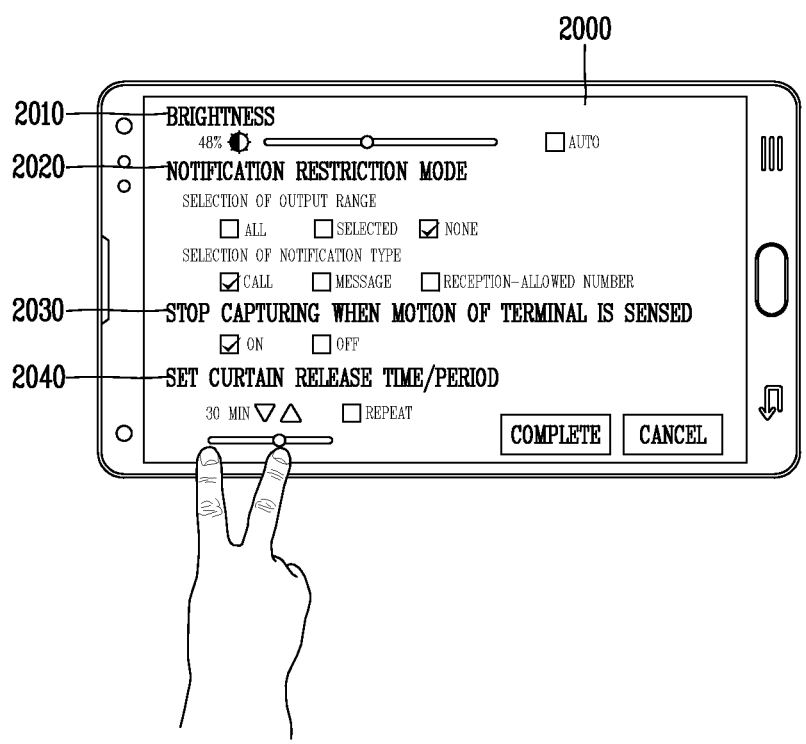
FIG. 20 is a conceptual view illustrating an embodiment to set an output state of an upper layer.

FIG. 20 is a conceptual view illustrating an embodiment to set an output state of an upper layer.

Referring to FIG. 20, in the embodiment aforementioned with reference to FIG. 15, a black upper layer 2000 may be output by a touch input using two fingers. Environment setting information 2010, 2020, 2030, 2040 about the upper layer 2000 may be output to the upper layer 2000.

In an embodiment, a brightness setting menu 2010 of the upper layer 2000 may be output. More specifically, a brightness control bar may be output.

In another embodiment, a notification setting menu 2020 may be output. A user may set an output range of a notification message while the upper layer 2000 is being output, through the notification setting menu 2020.

More specifically, if the output range of the notification message may include 'all', 'selected', and 'none'. If the 'none' is selected, a preset message may be automatically replied to an originated call.

A notification message may be selectively received according to its type. For instance, only a call, a text message, or a messenger message may be output as a notification message. Alternatively, a user may set only a notification message received from a specific person (a specific phone number), to be output.

In another embodiment, if a motion of the mobile terminal 100 is sensed, a menu 2030 inquiring whether to stop time-lapse photography or not may be output. If a motion of the mobile terminal 100 is sensed, time-lapse photography may be stopped.

In another embodiment, a menu 2040 to set an output time of the upper layer 2000 may be output. That is, an output time for which the upper layer 2000 is output, an output time interval indicating time taken for the upper layer 2000 which has disappeared to be re-output, etc. may be set.

In another embodiment, the environment setting information 2010, 2020, 2030, 2040 about the upper layer 2000 disappears, if a preset time lapses or a touch input is applied to a completion button.

Figure 21:
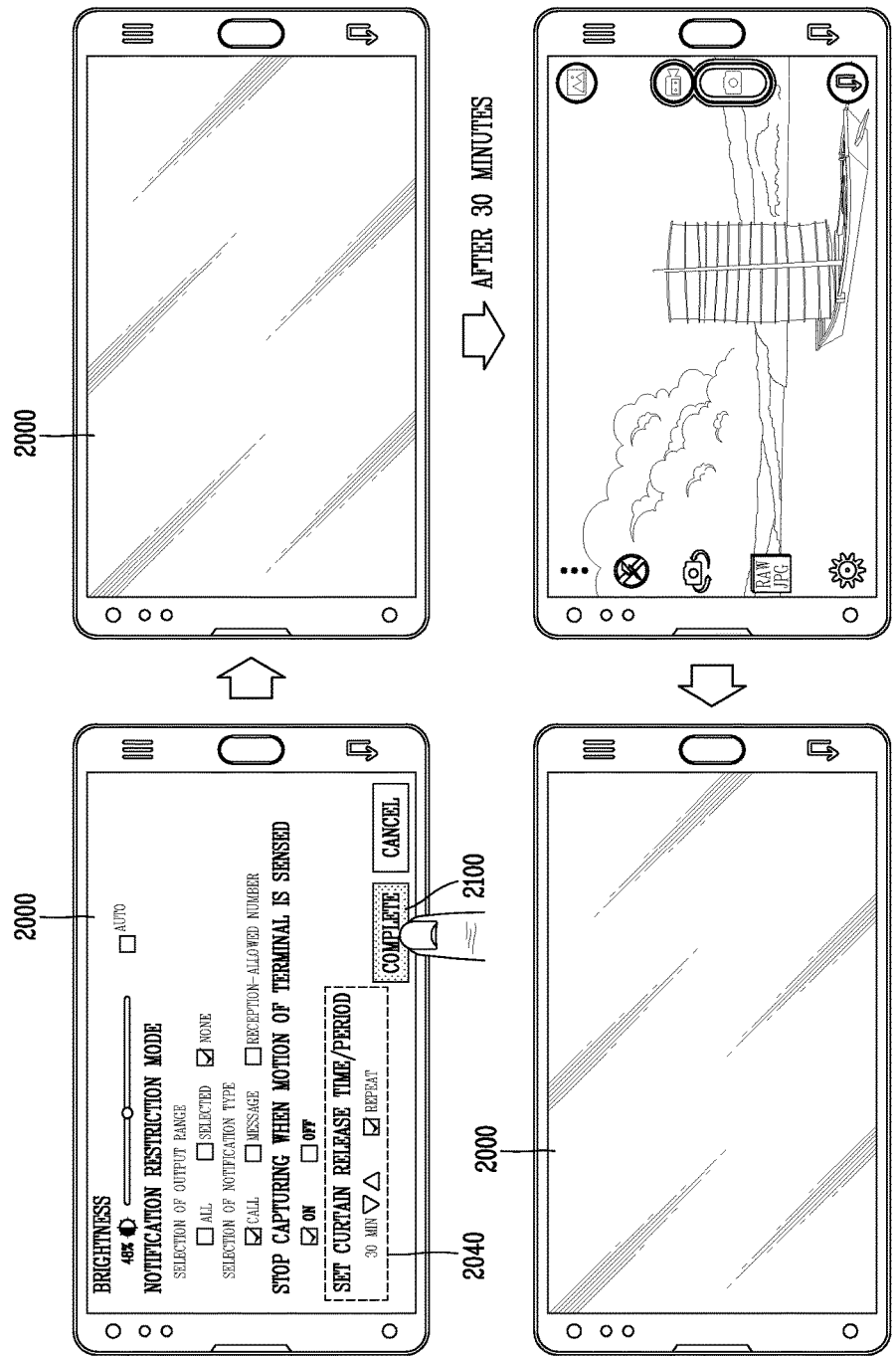
FIG. 21 is a conceptual view illustrating an embodiment to control an upper layer to disappear at preset time intervals.

FIG. 21 is a conceptual view illustrating an embodiment to control an upper layer to disappear at preset time intervals.

Referring to FIG. 21, as aforementioned with reference to FIG. 20, a user may set the upper layer 2000 to disappear per 30 minutes, and then to be re-output after a predetermined time, through the menu 2040 to set an output time of the upper layer 2000.

Then, if a touch input is applied to a completion button 2100, the environment setting information 2010, 2020, 2030, 2040 about the upper layer 2000 disappears, and only the upper layer 2000 remains.

After lapse of 30 minutes, the black upper layer 2000 may disappear, and an image being captured by time-lapse photography may be output. In this case, the black upper layer 2000 may disappear, and then (or at the same time) a preset sound, vibration, screen flickering, etc. may be output.

As the predetermined time lapses, the black upper layer 2000 is re-output to block the image being captured by time-lapse photography. Likewise, after lapse of 30 minutes, the black upper layer 2000 may disappear, and a preview image of the image being captured by time-lapse photography may be output.

Accordingly, a user may check the image being captured by time-lapse photography per 30 minutes.

Hereinafter, an embodiment related to a plurality of displays will be explained with reference to FIGS. 22 and 23.

Figure 22:
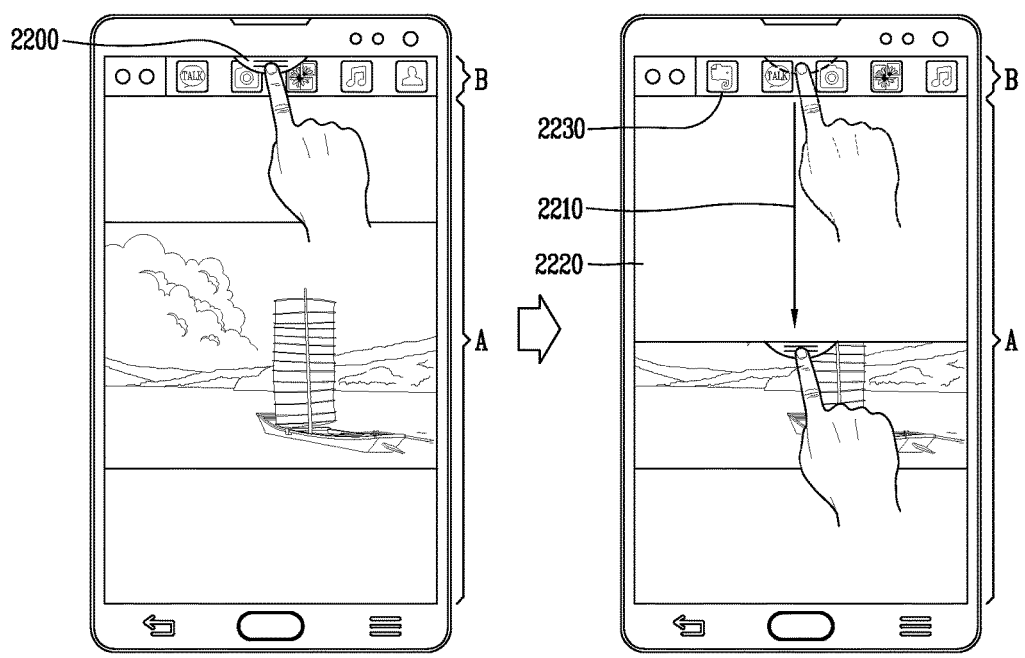
FIG. 22 is a conceptual view illustrating an embodiment to output an upper layer to a mobile terminal having a plurality of displays.

FIG. 22 is a conceptual view illustrating an embodiment to output an upper layer to a mobile terminal having a plurality of displays.

Referring to FIG. 22, the display unit 151 may be divided into a first part (A) and a second part (B) upward-extended from the first part (A). In an embodiment, an image being captured by time-lapse photography may be output to the first part (A), and a notification icon, a terminal state, etc. may be output to the second part (B).

In another embodiment, an icon 2200 of a handle shape for outputting a black upper layer 2220 may be output to the second part (B). That is, if a drag input 2210 is downward applied to the icon 2200, the black upper layer 2220 which blocks the image being captured by time-lapse photography may be output along the drag input 2210, up to a region where the drag input 2210 has been applied, or up to a lower end of the display unit 151.

In an embodiment, the first part (A) may be completely blocked by the black upper layer, and a notification icon, a terminal state, etc. may be output to the second part (B).

In another embodiment, when the upper layer is output, an icon 2230 indicating the output state may be output to the second part (B). A user may control the upper layer to be output or to disappear, by applying a touch input to the icon 2230.

Figure 23:
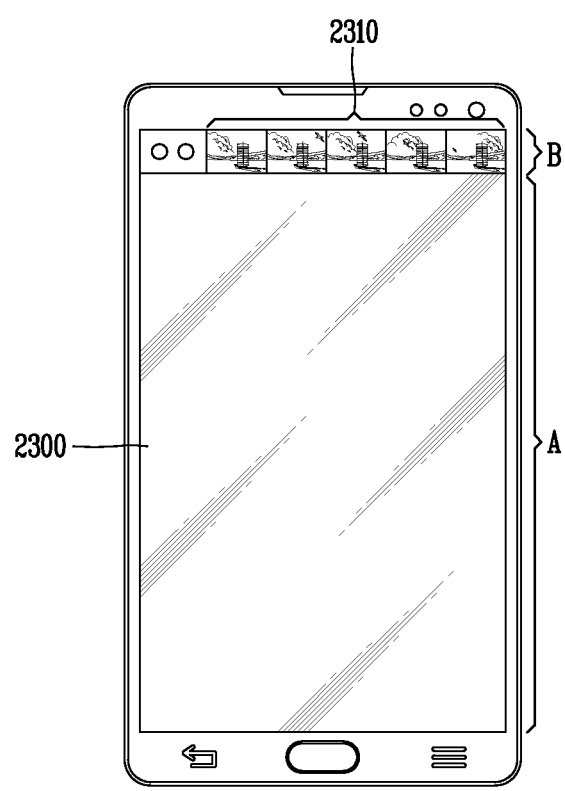
FIG. 23 is a conceptual view illustrating an embodiment to output an image being captured to a mobile terminal having a plurality of displays.

FIG. 23 is a conceptual view illustrating an embodiment to output an image being captured to a mobile terminal having a plurality of displays.

Referring to FIG. 23, as aforementioned with reference to FIG. 22, a black upper layer 2300 may be output to the first part (A), so as to block an image being captured by time-lapse photography.

An image being captured by time-lapse photography, or a thumbnail 2310 of a preview image may be output to the second part (B), in time order. In an embodiment, the thumbnail 2310 may be updated at preset time intervals.

With such a configuration, a user may view an image being captured by time-lapse photography, through the second part (B) (extended part) of the plurality of displays.

If a remaining battery or memory usage amount is reduced to a value less than a preset value during time-lapse photography, the controller 180 may change one region of the upper layer into a transparent state for a preset time, and may output the remaining battery or memory amount to the transparent one region.

In another embodiment, if a remaining battery or memory amount is reduced to a value less than a preset value during time-lapse photography, the controller 180 may control the upper layer to disappear, and may output the remaining battery or memory amount.

Figure 24:
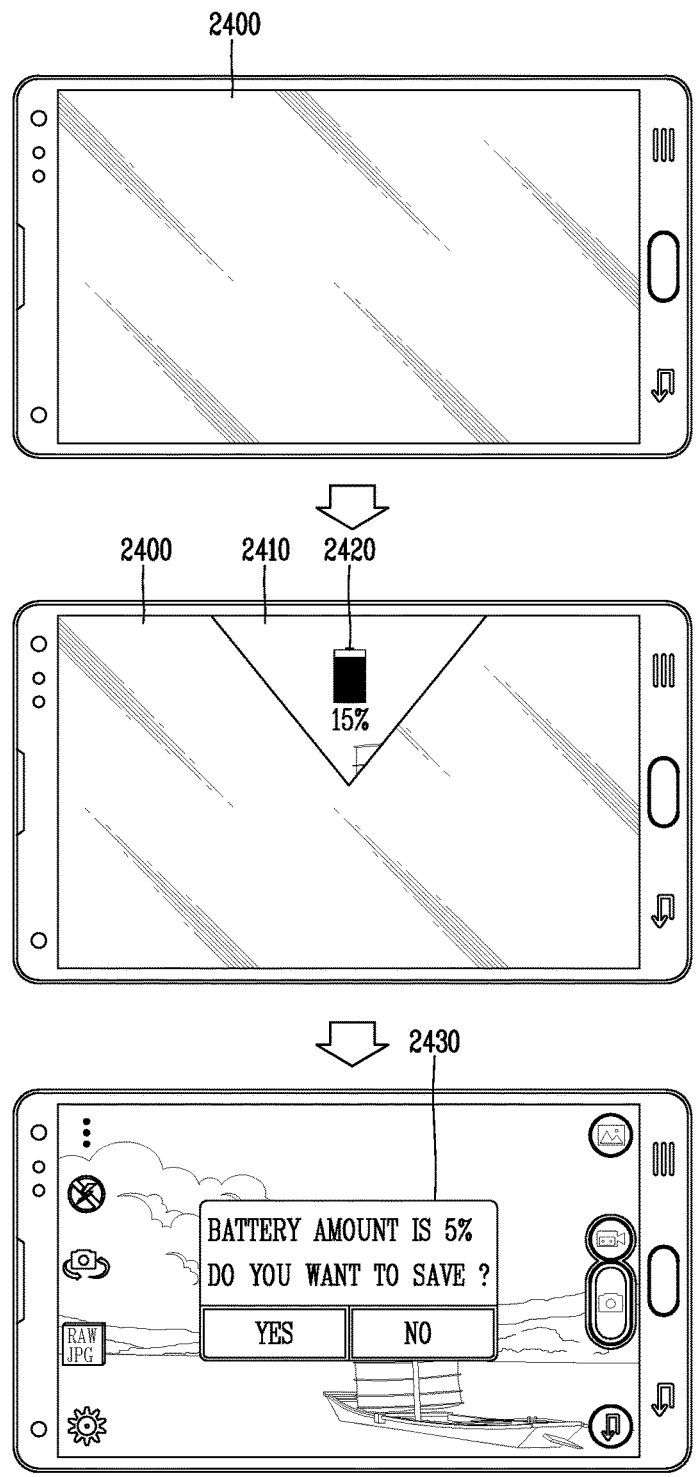
FIG. 24 is a conceptual view illustrating an embodiment to change an output state of an upper layer based on a battery usage amount.

FIG. 24 is a conceptual view illustrating an embodiment to change an output state of an upper layer based on a battery usage amount.

Referring to FIG. 24, in the aforementioned embodiments, an image being captured by time-lapse photography may be blocked by a black upper layer 2400. If a battery remaining amount is 15%, a preset region 2410 of the upper layer 2400 is changed into a transparent state, and a battery remaining amount 2420 may be output to the preset region 2410.

As a predetermined time lapses, a transparent degree of the preset region 2410 is reduced and the original state is output. That is, only the black upper layer 2400 is output.

If the battery remaining amount becomes 5%, the upper layer 2400 disappears, and a pop-up window 2430 indicating the battery remaining amount and inquiring whether to save state information or not, may be output. As the upper layer 2400 disappears, the image being captured by time-lapse photography is seen.

Then, a user may re-output the upper layer 2400 by re-executing the aforementioned embodiments (drag input, etc.). That is, a different user interface may be output based on a battery remaining amount.

If a motion of the mobile terminal is sensed during time-lapse photography, the controller 180 may stop the time-lapse photography.

More specifically, if a motion of the mobile terminal is sensed during time-lapse photography, the controller 180 may control the upper layer to disappear, and may output guide information about a capturing position before the motion of the mobile terminal is sensed.

Figure 25:
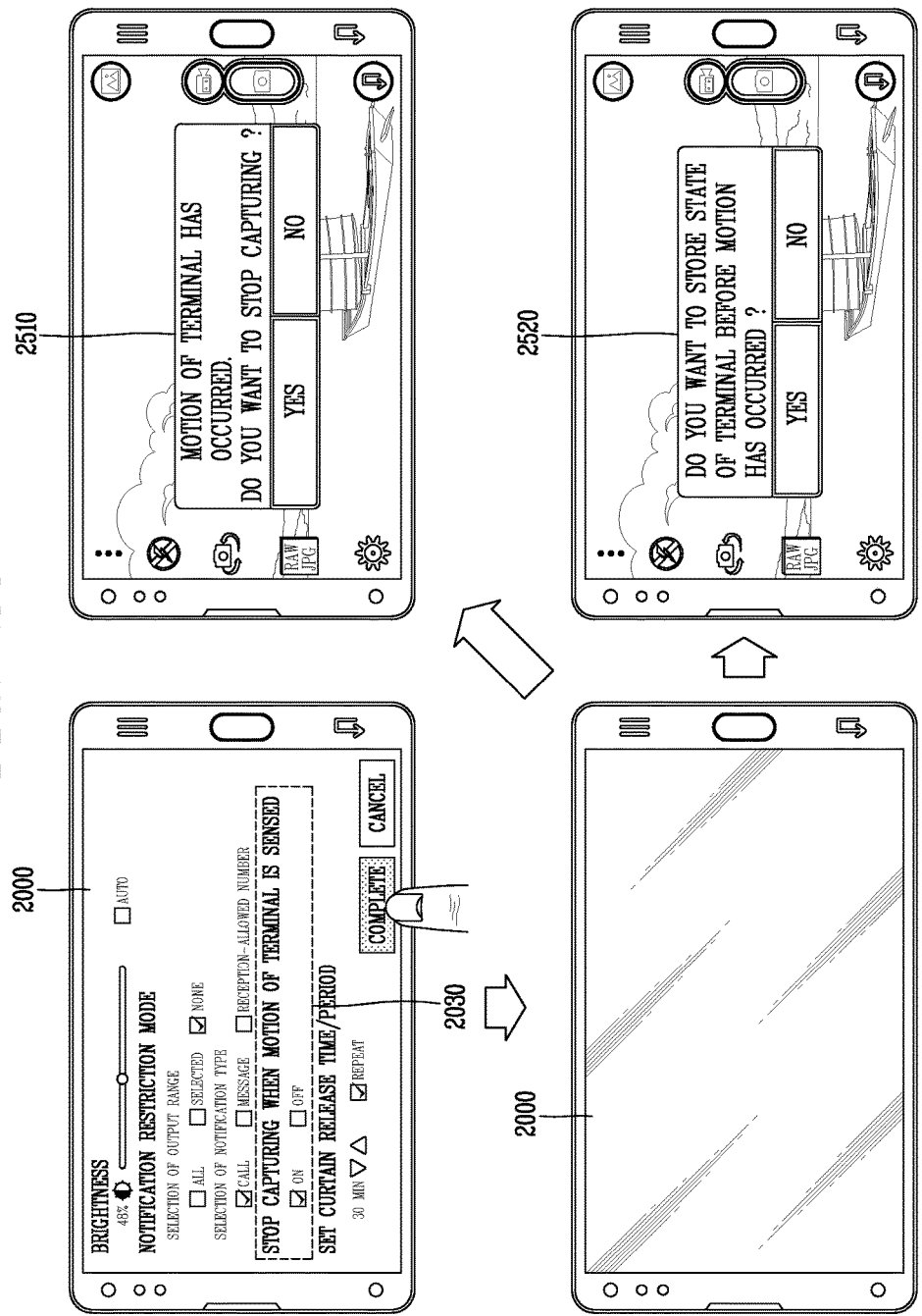
FIG. 25 is a conceptual view illustrating an embodiment to change an output state of an upper layer based on a motion of a mobile terminal.

FIG. 25 is a conceptual view illustrating an embodiment to change an output state of an upper layer based on a motion of a mobile terminal.

Referring to FIG. 25, as aforementioned with reference to FIG. 20, a user may execute a setting (2030) to stop time-lapse photography when a motion of the mobile terminal 100 is sensed. Then, if the user applies a touch input to a completion button, only the black upper layer 2000 is output.

Then, if a preset degree of motion of the mobile terminal 100 is sensed, the time-lapse photography may be stopped (temporarily stopped), and the output state of the upper layer 2000 may be terminated. In this case, may be output a pop-up window 2510 inquiring whether to stop the time-lapse photography or not, and a pop-up window 2520 inquiring whether to save state information of the mobile terminal before the motion of the mobile terminal 100 is sensed.

In an embodiment, when the pop-up windows 2510, 2520 are output, a preset sound, vibration, screen flickering, etc. may be output together.

FIG. 26 is a conceptual view illustrating an embodiment to output a capturing guide line based on a motion of a mobile terminal.

Referring to FIG. 26, if 'yes' is selected in response to the pop-up window 2520 inquiring whether to save state information of the mobile terminal before a motion of the mobile terminal 100 is sensed, a capturing guide line 2600 about a capturing position before a motion of the mobile terminal 100 is sensed may be output when the time-lapse photography is re-executed. In an embodiment, the capturing guide line may be output in a state where an image being captured by time-lapse photography is seen in a semi-transparent state.

If a capturing position is aligned with the capturing guide line 2600, the capturing guide line 2600 disappears while a preset sound, vibration, screen flickering or the like is output.

If a preset state of a subject is sensed during the time-lapse photography, the controller 180 may control the upper layer to disappear, and may output a preview image of the subject being captured.

FIG. 27 is a conceptual view illustrating an embodiment to control an upper layer to disappear by change of a capturing object.

Referring to FIG. 27, similar images are selected before time-lapse photography. And if a scene similar to the corresponding images occurs during the time-lapse photography, an upper layer 2700 may disappear from the display unit.

In an embodiment, if blossoming images are selected before time-lapse photography, the upper layer 2700 may disappear when a flower is blossoming or a bud appears during the time-lapse photography. In this case, a scene being captured may be output.

In another embodiment, if images related to hatching from eggs are selected before time-lapse photography, the upper layer 2700 may disappear when an egg hatches during the time-lapse photography. In this case, a scene being captured may be output.

In another embodiment, if bird images are selected before time-lapse photography, the upper layer 2700 may disappear when a bird sitting on a branch starts to be captured. In this case, a scene 2710 being captured may be output.

Figure 28:
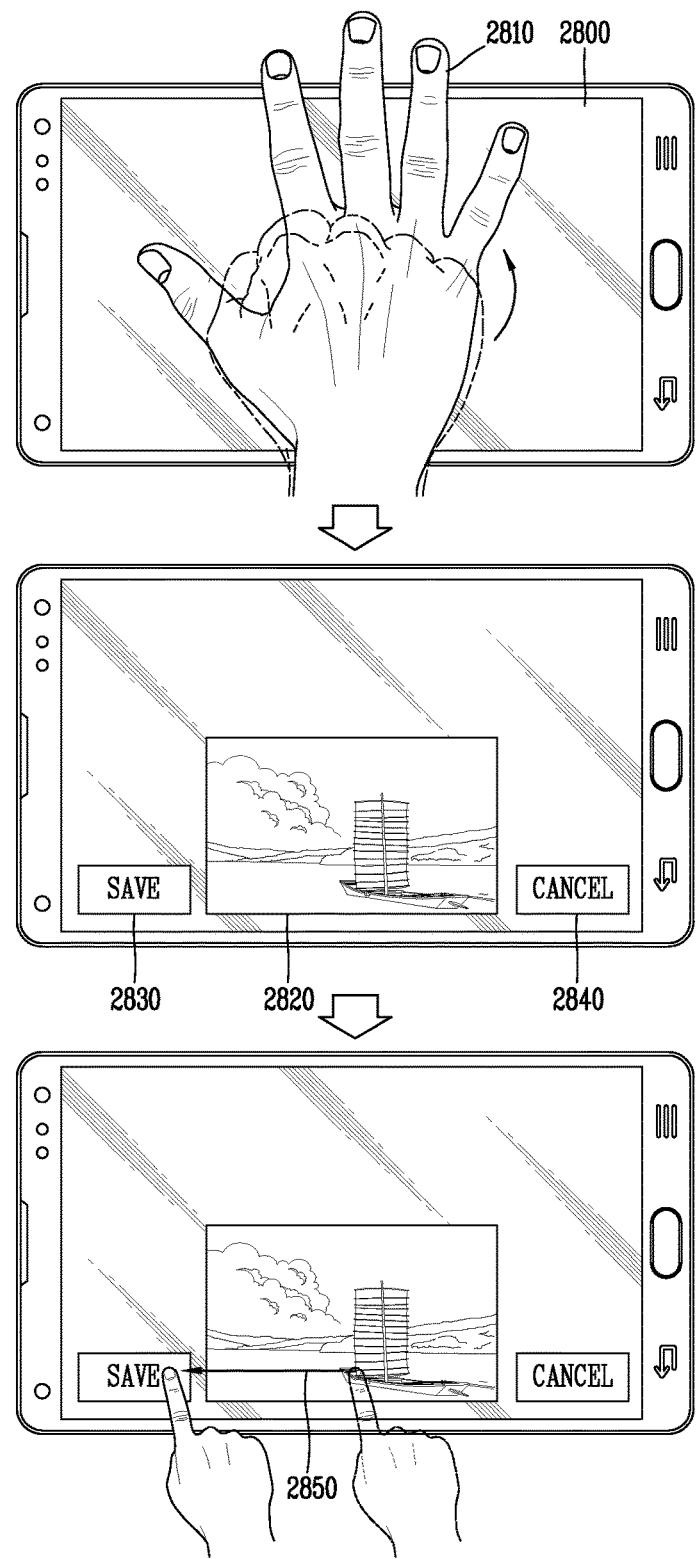
FIG. 28 is a conceptual view illustrating an embodiment to execute still shot capturing by a preset gesture.

Hereinafter, another embodiment will be explained. FIG. 28 is a conceptual view illustrating an embodiment to execute still shot capturing by a preset gesture.

Referring to FIG. 28, in the aforementioned embodiments, when a black upper layer 2800 which blocks an image being captured by time-lapse photography is output, a user may apply a gesture 2810 to bend a plurality of fingers and then to spread out the fingers gradually.

As a result, a preview image 2820 of an image being captured may be output to a lower end of the upper layer 2800. In this case, a save icon 2830 may be output to the left side of the preview image 2820, and a cancel icon 2840 may be output to the right side of the preview image 2820.

The user may save (capture) the preview image 2820 by dragging the preview image 2820 to the left, or may not save (capture) the preview image 2820 by dragging the preview image 2820 to the right.

In an embodiment, if a rightward drag input 2850 is applied to the preview image 2820, the preview image 2820 may be captured. That is, still shot capturing of the image being captured by time-lapse photography may be executed.

On the other hand, if a leftward drag input is applied to the preview image 2820, the still shot capturing of the image may be canceled.

The black upper layer may be output to an execution screen of a preset application, as well as an image being captured by time-lapse photography.

In an embodiment, if a multi-touch input is applied while a user is viewing videos, a black upper layer which blocks the videos may be output without temporary pause of the videos.

In this case, the upper layer may disappear, if a specific word is mentioned while the videos are being played, or if a voice or a face of a preset person is output, the upper layer may disappear.

In another embodiment, if a multi-touch input is applied during a game play, a black upper layer which blocks a game screen may be output without temporary pause of the game.

In this case, the upper layer may disappear, if a pop-up window is output during the game play, if a specific situation occurs on a game character, if a battery usage amount is lowered to a value less than a preset value, etc.

In another embodiment, in a state where a black upper layer has been output to a stock screen, if an amount of money a specific stock is changed to a value more than or less than a predetermined amount of money, the upper layer may disappear.

In another embodiment, a user may output a black upper layer which blocks a vehicle navigation screen or a black box screen, by applying a multi-touch input onto the screen. As a result, a battery consumption amount may be reduced, and the user may concentrate on driving better. If the upper layer disappears by a preset touch input after capturing, may be output a message pop-up window inquiring whether to save a corresponding video captured on the black box screen.

The mobile terminal and the control method thereof according to the present invention may have the following advantages.

Firstly, in at least one of preferred embodiments of the present invention, a user's inconvenience to directly monitor an image being captured by time-lapse photography, or to set capturing set values, may be solved.

Further, in at least one of preferred embodiments of the present invention, a battery usage amount or a memory usage amount may be efficiently used to the maximum.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a camera;
a display; and
a controller configured to:
cause the display to display a preview image of an image to be captured via the camera by time-lapse photography;
calculate at least one capturing set value that is different from a preset capturing set value for the time-lapse photography based on at least one of an input of a capturing set value, a battery usage amount, or a memory usage amount;
cause the display to display an opaque layer for blocking the image being captured by the time-lapse photography in response to a preset input received during the time-lapse photography, the opaque layer having a preset brightness level; and
cause the display to display the preview image on the opaque layer periodically at preset time intervals.

2. The mobile terminal of claim 1, wherein:
the at least one capturing set value comprises at least one of an entire capturing time, a capturing time interval, a frame rate or frames per second (FPS), a shutter speed, an image brightness, an image resolution, an image size, or an image ratio; and
the controller is further configured to calculate the at least one capturing set value based on the battery or memory usage amount.

3. The mobile terminal of claim 2, wherein the controller is further configured to calculate a threshold value of the at least one capturing set value based on at least one of the battery usage amount or the memory usage amount.

4. The mobile terminal of claim 2, wherein the controller is further configured to:
keep at least one capturing set value selected by a user among the at least one capturing set value; and
calculate at least one capturing set value among the at least one capturing set value, other than the kept at least one capturing set value, based on at least one of the kept at least one capturing set value, the battery usage amount, or the memory usage amount.

5. The mobile terminal of claim 2, wherein the controller is further configured to calculate at least one of the capturing time interval or the entire capturing time based on the battery or memory usage amount that is increased or decreased in response to a user input for increasing or decreasing the battery usage amount or the memory usage amount to be used for the time-lapse photography.

6. The mobile terminal of claim 2, wherein the controller is further configured to cause the display to display recommendation of the at least one capturing set value for the time-lapse photography according to a type of an object to be included in the captured image.

7. The mobile terminal of claim 2, wherein the controller is further configured to cause the display to display screen information for changing the at least one capturing set value for the time-lapse photography in response to a preset input received from a user during the time-lapse photography.

8. The mobile terminal of claim 2, wherein the controller is further configured to cause the display to display screen information for changing the at least one capturing set value for the time-lapse photography when:
- a remaining battery usage amount or a remaining memory usage amount is reduced to a value that is less than a threshold value during the time-lapse photography; or
- the time-lapse photography based on current capturing set values is determined to be not executable with the remaining battery or memory usage amount.

9. The mobile terminal of claim 2, wherein the controller is further configured to cause the display to display screen information for changing the at least one capturing set value for the time-lapse photography when a preset capturing state is detected during the time-lapse photography.

10. The mobile terminal of claim 1, wherein the controller is further configured to cause the display to display capturing information related to the layer on the opaque layer in response to the preset input.

11. The mobile terminal of claim 1, wherein the controller is further configured to cause the display to display the preview image on the opaque layer in response to a preset input applied by a user via the layer.

12. The mobile terminal of claim 1, wherein the controller is further configured to cause the display to display the preview image by increasing a transparency level of the layer in response to a preset input applied by a user via the opaque layer.

13. The mobile terminal of claim 1, wherein the controller is further configured to cause the display to stop displaying the opaque layer in response to a preset input applied by a user via the opaque layer.

14. The mobile terminal of claim 1, wherein the controller is further configured to cause the display to change transparency of one region of the layer, such that the one region of the layer is in a transparent state for a preset period of time while the rest of the layer remains in the opaque state, and to display a remaining battery or memory amount via the transparent region of the layer when the remaining battery or memory amount is reduced to a value that is less than a threshold value during the time-lapse photography.

15. The mobile terminal of claim 1, wherein the controller is further configured to cause the display to stop displaying the opaque layer and to display a remaining battery or memory amount when the remaining battery or memory amount is reduced to a value that is less than a threshold value during the time-lapse photography.

16. The mobile terminal of claim 1, wherein the controller is further configured to cause the display to stop displaying the opaque layer and to display guide information about a capturing position when a motion of the mobile terminal is detected during the time-lapse photography, the capturing position being a position prior to the detection of the motion of the mobile terminal.

17. The mobile terminal of claim 1, wherein the controller is further configured to cause the display to stop displaying the opaque layer and to display a preview image of an image including a subject and to be captured when a preset state of the subject is detected during the time-lapse photography.

18. A method for controlling a mobile terminal, comprising:
- displaying, via a display, a preview image of an image to be captured via a camera by time-lapse photography;
- calculating at least one capturing set value that is different from a preset capturing set value for the time-lapse photography based on at least one of an input of a capturing set value, a battery usage amount, or a memory usage amount;
- displaying an opaque layer for blocking the image being captured by the time-lapse photography in response to a preset input received during the time-lapse photography, the opaque layer having a preset brightness level; and
- displaying the preview image on the opaque layer periodically at preset time intervals.

* * * * *